US012574360B2

(12) United States Patent
Greene et al.

(10) Patent No.: US 12,574,360 B2
(45) Date of Patent: Mar. 10, 2026

(54) SYSTEM AND METHOD USING GENETIC ALGORITHMS FOR ANOMALY DETECTION IN A MOBILE NETWORK

(71) Applicant: Booz Allen Hamilton Inc., McLean, VA (US)

(72) Inventors: Alexandra Kay Greene, Annapolis Junction, MD (US); Kristopher Joseph Hall, Annapolis Junction, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 301 days.

(21) Appl. No.: 18/327,596

(22) Filed: Jun. 1, 2023

(65) Prior Publication Data

US 2023/0396639 A1      Dec. 7, 2023

Related U.S. Application Data

(60) Provisional application No. 63/348,198, filed on Jun. 2, 2022.

(51) Int. Cl.
*H04L 9/40* (2022.01)
*G06F 16/28* (2019.01)
(Continued)

(52) U.S. Cl.
CPC ............ *H04L 63/08* (2013.01); *G06F 16/288* (2019.01); *G06F 16/683* (2019.01); *G06N 20/00* (2019.01);
(Continued)

(58) Field of Classification Search
CPC . H04L 63/08; H04L 63/1433; H04L 63/1425; H04L 63/1408; H04L 63/1441;
(Continued)

(56) References Cited

U.S. PATENT DOCUMENTS

| | | | |
|---|---|---|---|
| 2017/0279660 A1* | 9/2017 | Muntés-Mulero | .... G06F 16/288 |
| 2017/0374091 A1* | 12/2017 | Igbe | .................... H04L 63/1441 |

(Continued)

FOREIGN PATENT DOCUMENTS

JP      WO2007066787 A1 * 12/2006

OTHER PUBLICATIONS

Complex Systems and AI, "Negative selection algorithm", https://complex-systems-ai.com/en/immune-algorithm/negative-selection-algorithm/, 2023, 3 pages.

(Continued)

*Primary Examiner* — Kyung H Shin
(74) *Attorney, Agent, or Firm* — Buchanan Ingersoll & Rooney PC

(57) ABSTRACT

Exemplary systems and methods are directed to anomaly detection on a mobile communication network. A computing device receives data samples formatted from at least an endpoint and/or an interface on the mobile network. The computing device uses an encoder to build a data model of the mobile network data using data included in one or more data fields of each received data sample. The data model including datasets that meet at least one of a security or performance specification. A set of detectors is generated from the data model by performing a negative selection to select one or more datasets that do not match data that meets the security or performance specification, as well as genetic algorithm operations if anomalous data is available. Data is extracted from the received data samples and compared to the set of detectors to determine whether the mobile network data includes an anomaly.

35 Claims, 15 Drawing Sheets

(51) Int. Cl.

| | |
|---|---|
| *G06F 16/683* | (2019.01) |
| *G06N 20/00* | (2019.01) |
| *G06V 10/25* | (2022.01) |
| *H04L 41/16* | (2022.01) |

(52) U.S. Cl.

CPC .............. *G06V 10/25* (2022.01); *H04L 41/16* (2013.01); *H04L 63/1425* (2013.01); *H04L 63/1441* (2013.01)

(58) Field of Classification Search

CPC ....... H04L 67/12; H04L 63/20; H04L 41/065; H04L 41/12; G06F 16/24568; G06F 16/683; G06F 21/32; G06F 16/288; G06N 20/00; G06N 3/126; G06V 10/25; G06V 20/625; G06V 20/56; G06V 20/05; G06V 20/44; G06V 20/54; G06V 20/52; G10L 15/06; G10L 17/26; G10L 15/02; G10L 17/22; G10L 17/06; G10L 15/08; A61B 5/4803; G01N 23/20

See application file for complete search history.

(56) References Cited

U.S. PATENT DOCUMENTS

| | | | | |
|---|---|---|---|---|
| 2018/0013776 | A1 * | 1/2018 | Gay ....................... | G06N 20/00 |
| 2019/0238574 | A1 * | 8/2019 | Iliofotou ................ | H04L 63/08 |
| 2021/0056976 | A1 * | 2/2021 | Brown .................. | G06F 16/683 |
| 2021/0409375 | A1 | 12/2021 | Burakovsky et al. | |
| 2022/0405514 | A1 * | 12/2022 | Guzik ................... | G06V 10/25 |

OTHER PUBLICATIONS

Fernandes et al., "Applications of Artificial Immune Systems to Computer Security: A Survey", Journal of Information Security and Applications, Jun. 29, 2017, pp. 138-159, vol. 35, XP085173393.

Igbe et al., "Distributed Network Intrusion Detection System: An Artificial Immune System Approach", 2016 IEEE First Conference on Connected Health Applications, Systems and Engineering Technologies, Jun. 27, 2016, pp. 101-106, vol. 110, No. 4., XP032945814.

Ji et al., "Revisiting Negative Selection Algorithms", Evolutionary Computation, MIT Press, Cambridge, MA, Jun. 2007, pp. 223-251, vol. 15, No. 2., XP058253600.

International Search Report and Written Opinion of the International Searching Authority (Forms PCT/ISA/220, PCT/ISA/210 and PCT/ISA/237) issued on Sep. 8, 2023, by the European Patent Office in corresponding International Application No. PCT/US2023/024152. (12 pages).

* cited by examiner

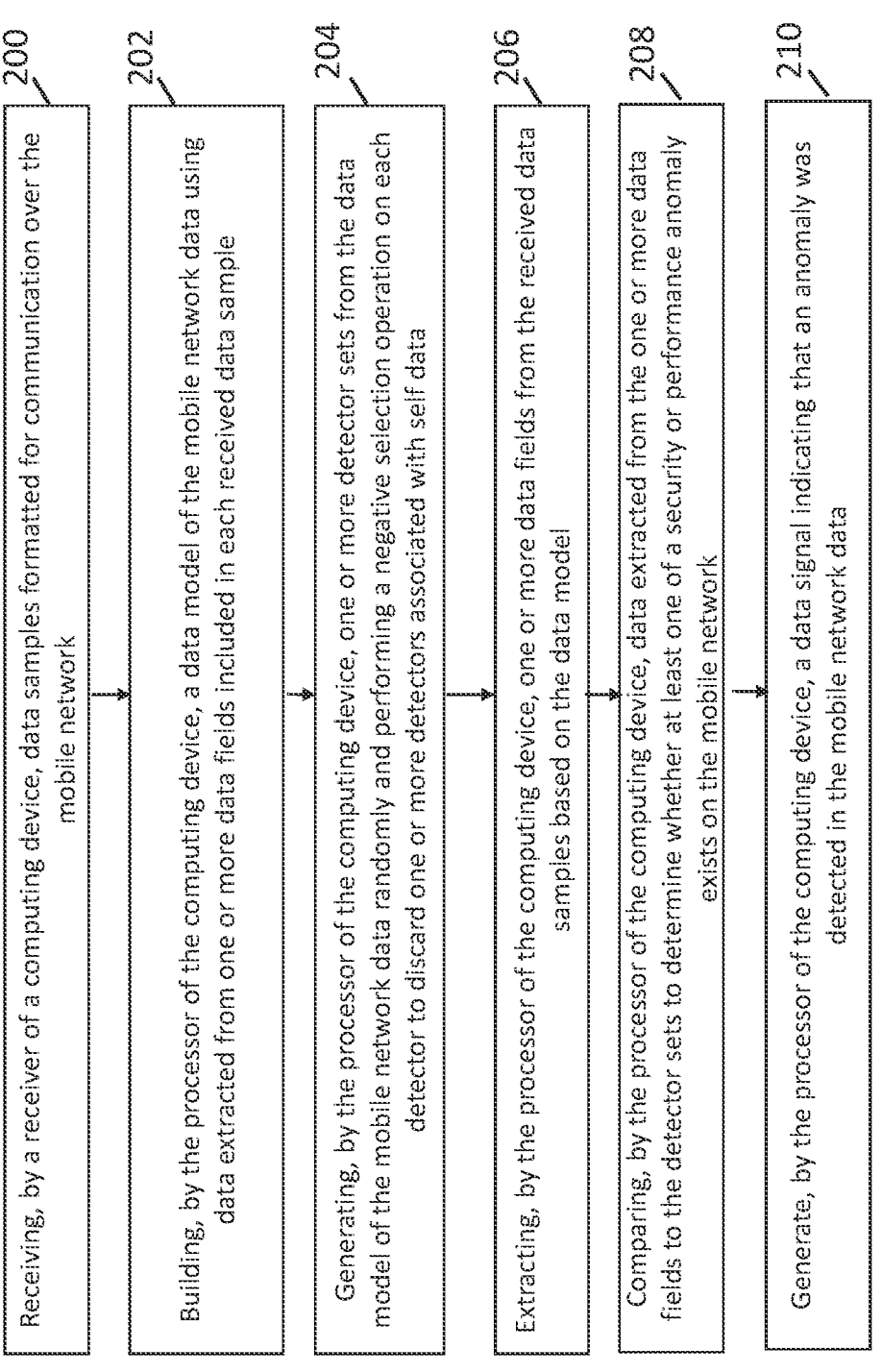

Receiving, by a receiver of a computing device, data samples formatted for communication over the mobile network

200

Building, by the processor of the computing device, a data model of the mobile network data using data extracted from one or more data fields included in each received data sample

202

Generating, by the processor of the computing device, one or more detector sets from the data model of the mobile network data randomly and performing a negative selection operation on each detector to discard one or more detectors associated with self data

204

Extracting, by the processor of the computing device, one or more data fields from the received data samples based on the data model

206

Comparing, by the processor of the computing device, data extracted from the one or more data fields to the detector sets to determine whether at least one of a security or performance anomaly exists on the mobile network

208

Generate, by the processor of the computing device, a data signal indicating that an anomaly was detected in the mobile network data

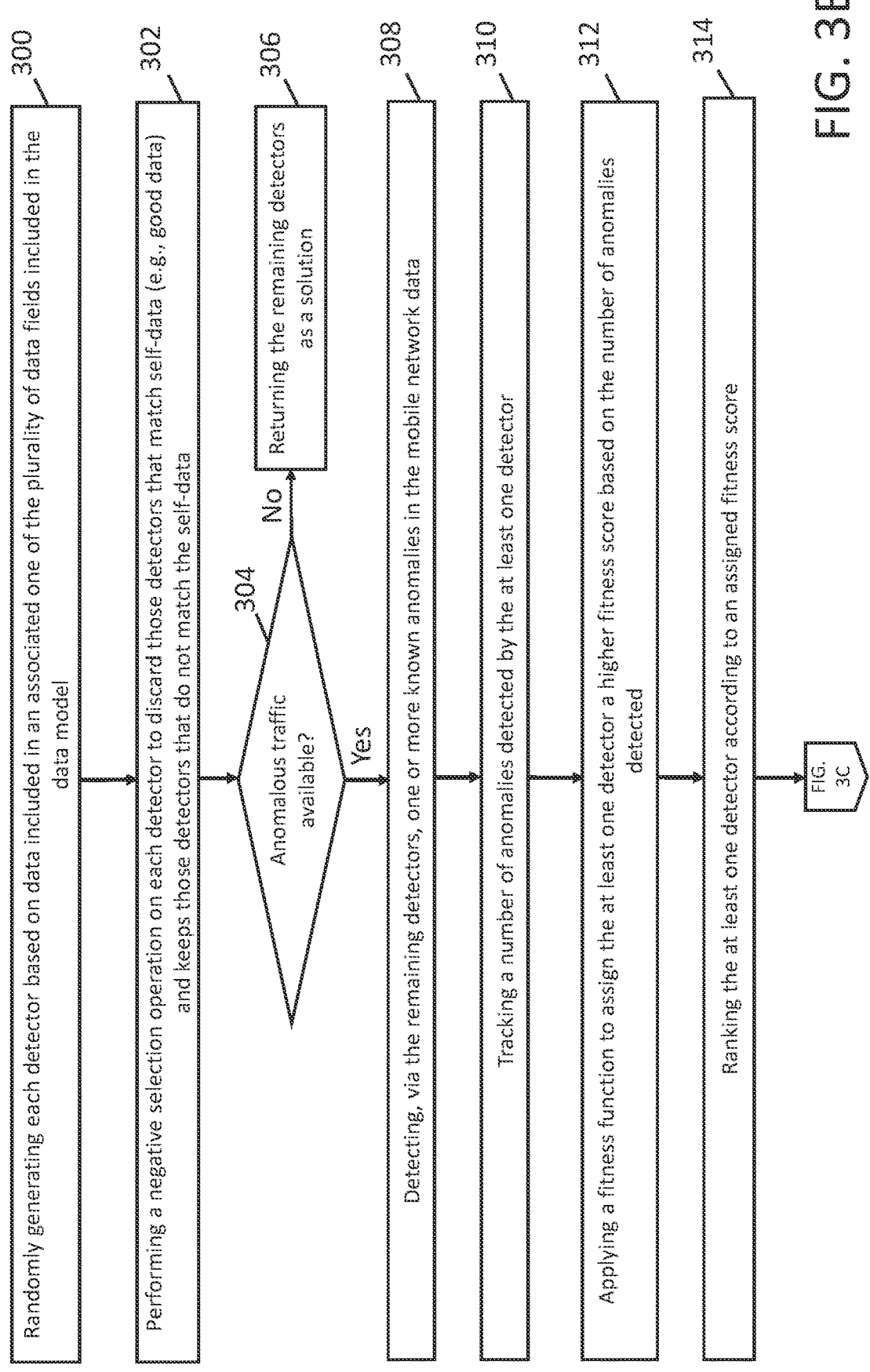

300   Randomly generating each detector based on data included in an associated one of the plurality of data fields included in the data model 302   Performing a negative selection operation on each detector to discard those detectors that match self-data (e.g., good data) and keeps those detectors that do not match the self-data 304   Anomalous traffic available?

No   306   Returning the remaining detectors as a solution

Yes

308   Detecting, via the remaining detectors, one or more known anomalies in the mobile network data 310   Tracking a number of anomalies detected by the at least one detector 312   Applying a fitness function to assign the at least one detector a higher fitness score based on the number of anomalies detected 314   Ranking the at least one detector according to an assigned fitness score

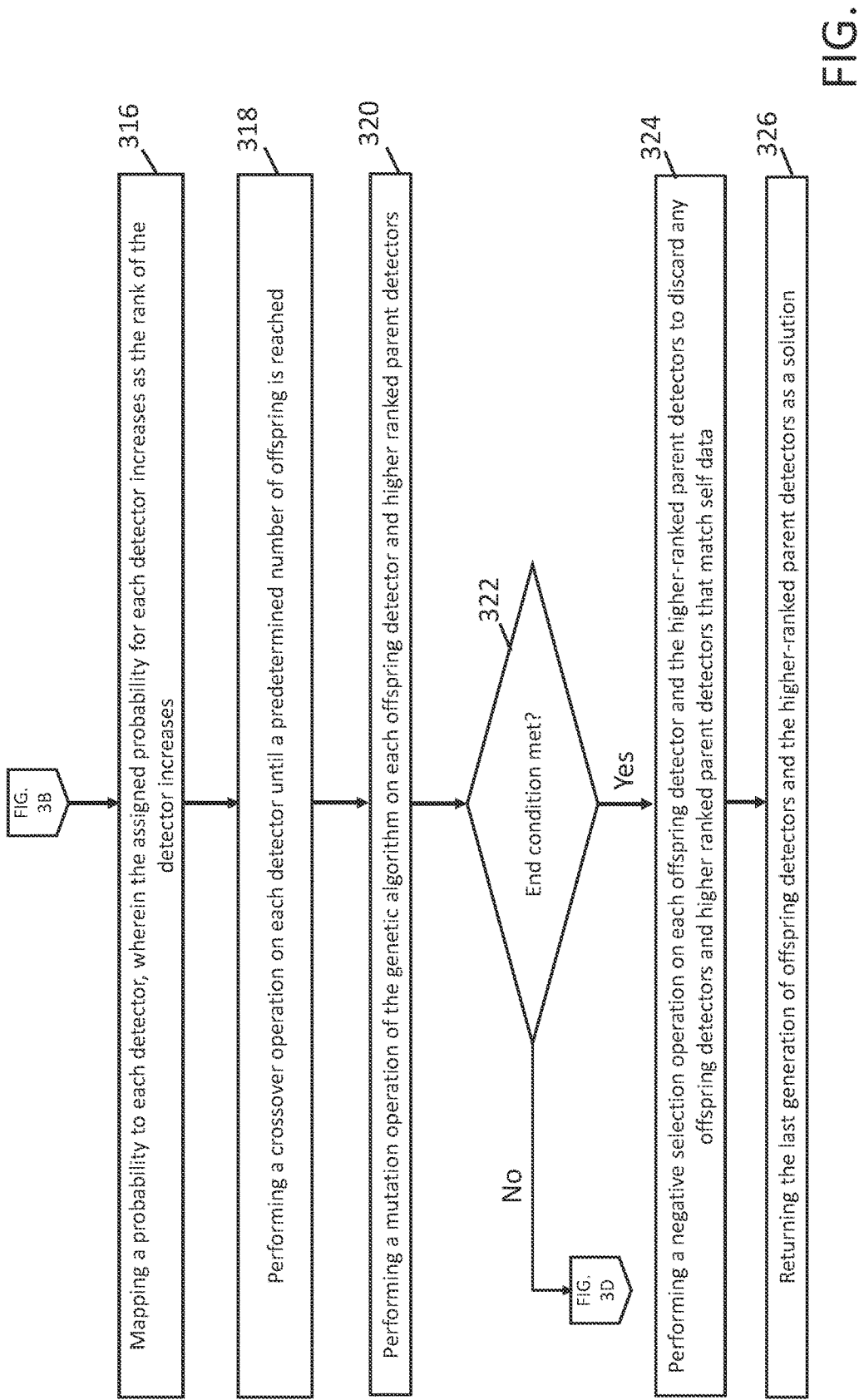

316

Mapping a probability to each detector, wherein the assigned probability for each detector increases as the rank of the detector increases

318

Performing a crossover operation on each detector until a predetermined number of offspring is reached

320

Performing a mutation operation of the genetic algorithm on each offspring detector and higher ranked parent detectors

322

End condition met?

Yes

324

Performing a negative selection operation on each offspring detector and the higher-ranked parent detectors to discard any offspring detectors and higher ranked parent detectors that match self data

326

Returning the last generation of offspring detectors and the higher-ranked parent detectors as a solution

SYSTEM AND METHOD USING GENETIC ALGORITHMS FOR ANOMALY DETECTION IN A MOBILE NETWORK

FIELD

The present disclosure relates to anomaly detection for a mobile network, and particularly to using genetic algorithms for anomaly detection.

BACKGROUND

Mobile networks, which are inclusive of endpoints, are designed to connect endpoints to communications services, either internal or external to the mobile network. Endpoints connect to mobile network services via an Access Network (AN), which can use numerous wired or wireless technologies. Mobile networks typically employ at least a Radio Access Network (RAN) to wirelessly connect endpoints to the mobile network. An endpoint uses the RAN and other parts of the mobile network to access communications services, either internal or external to the mobile network. Endpoints include, but are not limited to, devices such as smartphones, computers, tablets, watches, vehicles, sensors, actuators, or other suitable devices as desired. Endpoints connect to mobile network services via an AN, which can use one or more available wired or wireless communication technologies, which use electrical cabling (e.g., coaxial, twisted pair, or other suitable cabling as desired), optical fiber, satellite communication, cellular networks, radio and spread spectrum technologies, free space optical communication, or any other suitable communication technology as desired.

A RAN provides access to and coordinates the management of resources across radio sites, in concert with other functions in the mobile network. RANs include base stations and antennas which cover a specific region. The mobile network, inclusive of the RAN, exchanges signaling messages to attach the endpoint to the mobile network and establish a user session between the endpoint and communications services.

In known systems, mobile network architecture is divided into user plane and control plane segments. User plane refers to user traffic pertaining to the communications service. Control plane refers to the signaling messages necessary for operation of the mobile network, e.g. to connect the endpoint and handle its data. This mobile network architecture has been applied in second generation (2G), third generation (3G), fourth generation (4G) and 4G Long Term Evolution (LTE), and fifth generation (5G) networks.

Current systems face challenges in both performance and security monitoring. For example, in performance monitoring, it can be difficult or not time/economically feasible to build a comprehensive ruleset for non-performant conditions in which to alert the user to take corrective action, and the ruleset may need to be updated as the network or its use changes. For security monitoring, it can difficult or not time/economically feasible to develop a comprehensive security ruleset for both known and unknown attacks where the user should be alerted to take corrective action, and the ruleset may need to be updated as the network or its use changes and as the adversarial tactics and capabilities change.

SUMMARY

An exemplary method for anomaly detection in a mobile network is disclosed, the method comprising: storing, in memory of a computing device, programming code for generating a set of detectors for anomaly detection in the mobile network; executing, by a processor of the computing device, the programming code for generating the set of detectors, the programming code causing the processor to configure the computing device for: (a) receiving, by a receiver of a computing device, data samples formatted for communication over the mobile network; (b) building, by the processor of the computing device, a data model of the mobile network data using one or more data fields included in each received data sample, the data model including plural first datasets representing a mobile network data that meets at least one of a security or performance specification and plural second datasets representing mobile network data that does not meet at least one of a security or performance specification; (c) generating, by the processor of the computing device, the set of detectors from the data model of the mobile network data randomly and performing a negative selection operation on each detector to discard one or more detectors associated with the plural first datasets; (d) extracting, by the processor of the computing device, data from the one or more data fields included in the received data samples, the one or more data fields being used to build the data model; and (e) comparing, by the processor of the computing device, the extracted data to the one or more detectors to determine whether at least one of a security or performance anomaly exists on the mobile network.

An exemplary system for anomaly detection in a mobile network is disclosed, the system comprising: memory configured to store programming code for generating a set of detectors for anomaly detection in the mobile network; a receiver configured to receive data samples formatted for communication over the mobile network; a processor configured to execute the programming code for generating the set of detectors, the programming code causing the processor to: (a) build a data model of the mobile network data using one or more data fields included in each received data sample, the data model including plural first datasets representing a mobile network data that meets at least one of a security or performance specification and plural second datasets representing mobile network data that does not meet at least one of a security or performance specification; (b) generate the set of detectors from the data model of the mobile network data randomly and perform a negative selection operation on each detector to discard one or more detectors associated with the plural first datasets; (c) extract data from the one or more data fields included in the received data samples, the one or more data fields being used to build the data model; and (d) compare the extracted data to the set of detectors to determine whether at least one of a security or performance anomaly exists on the mobile network.

An exemplary non-transitory computer-readable medium that stores programming code for performing anomaly detection in a mobile communication network is disclosed, the computer-readable medium when placed in communicable contact with a computing device, causes the computing device to perform operations comprising: storing, in memory of a computing device, programming code for generating a set of detectors for anomaly detection in the mobile communication network; executing, by a processor of the computing device, the programming code for generating the set of detectors, the programming code causing the processor to configure the computing device for: (a) receiving, by a receiver of a computing device, data samples formatted for communication on the mobile network; (b) building, by the processor of the computing device, a data model of the mobile network data using one or more data fields included in each received data sample, the data model including plural first datasets representing a mobile network data that meets at least one of a security or performance specification and plural second datasets representing mobile network data that does not meet at least one of a security or performance specification; (c) generating, by the processor of the computing device, the set of detectors from the data model of the mobile network data randomly and performing a negative selection operation on each detector to discard one or more detectors associated with the plural first datasets; (d) extracting, by the processor of the computing device, data from one or more data fields included in the received data samples, the one or more data fields being used to build the data model; and (e) comparing, by the processor of the computing device, the extracted data to the set of detectors to determine whether at least one of a security or performance anomaly exists on the mobile network.

BRIEF DESCRIPTION OF THE DRAWINGS

Exemplary embodiments are best understood from the following detailed description when read in conjunction with the accompanying drawings. Included in the drawings are the following figures:

FIG. 2 illustrates a process for anomaly detection in a mobile network in accordance with an exemplary embodiment of the present disclosure.

FIGS. 3A to 3E illustrates a process flow for detector dataset generation in accordance with an exemplary embodiment of the present disclosure.

FIG. 9 illustrates a data sample format in accordance with an exemplary embodiment of the present disclosure.

Further areas of applicability of the present disclosure will become apparent from the detailed description provided hereinafter. It should be understood that the detailed descriptions of exemplary embodiments are intended for illustration purposes only and, therefore, are not intended to necessarily limit the scope of the disclosure.

DETAILED DESCRIPTION

Figure 6:
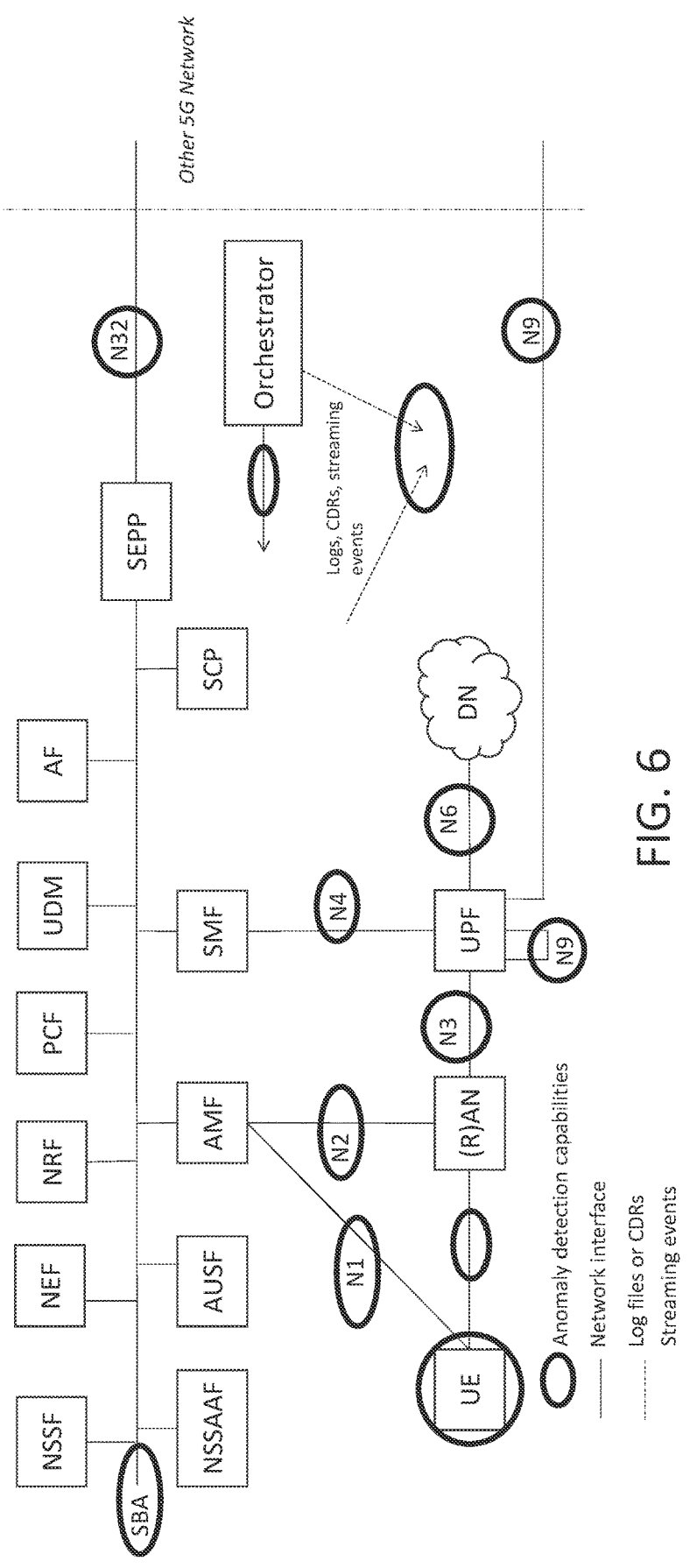
FIG. 6 illustrates anomaly detection in a 5G mobile network architecture in accordance with an exemplary embodiment of the present disclosure.

Exemplary embodiments of the present disclosure are directed to a system and method which can operate on an N4 interface, which connects the Session Management Function (SMF) and the User Plane Function (UPF), using the Packet Forwarding Control Protocol (PFCP) for a 5G mobile network (see FIG. 6). The system and method can generate many random representations of PFCP messages ("detectors"), and then removes the detectors that match known good PFCP messages ("self-data") sourced from the PFCP link where the real-time detector will operate. The random configurations use fields specific to 5G/PFCP such as PFCP message type, flag indicating whether the Session Endpoint IDentifier (SEID) is set, and information element types present in the packet, as well as several Internet protocol (IP) fields, such as, source & destination IP, source & destination port, among others. The remaining detectors are compared to live traffic, likely using commercial tools. Anomalies are detected when a detector matches traffic, because the detectors that match known good traffic were previously removed. Further, these anomalies are ones that have not been seen before.

Figure 7A:
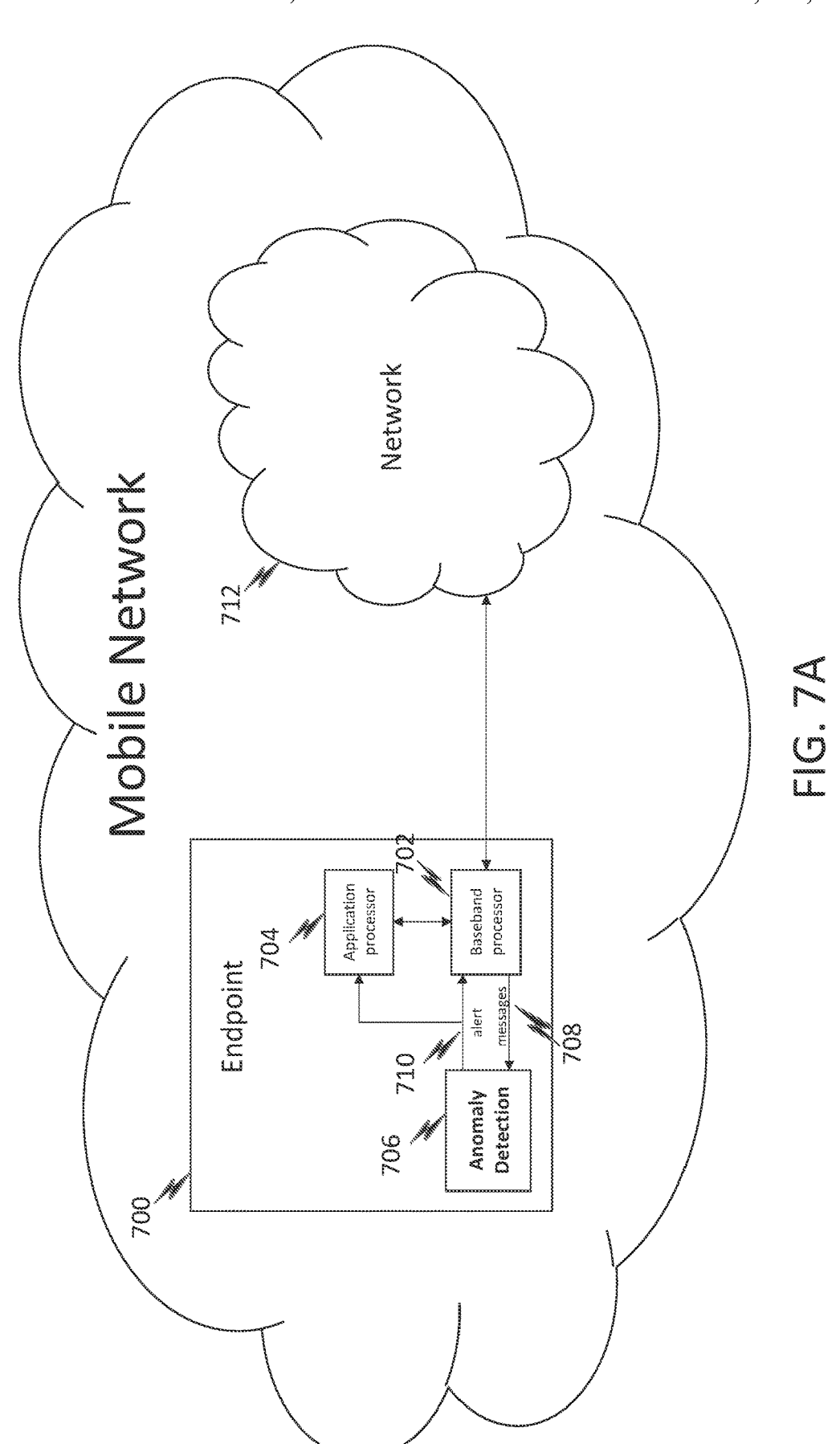
FIG. 7A illustrates anomaly detection at an endpoint in a mobile network architecture in accordance with an exemplary embodiment of the present disclosure.

Exemplary embodiments of the present disclosure are also directed to a system and method which can operate on an endpoint, by looking at the messages that the baseband processor receives (see FIG. 7A). The system and method can generate many random representations of baseband messages ("detectors"), and then removes the detectors that match known good baseband messages ("self-data") sourced from the N1/N2 link where the real-time detector will operate. The random configurations use fields specific to 5G N1/N2 interfaces such as subCarrierSpacingCommon, cellSelectionInfo, securityAlgorithmConfig. Any remaining detectors are compared to live traffic, using suitable commercial tools. Anomalies can be detected when a detector matches traffic, because the detectors that match known good traffic were previously removed. The anomalies are ones that have not been previously observed in network traffic.

Figure 1:
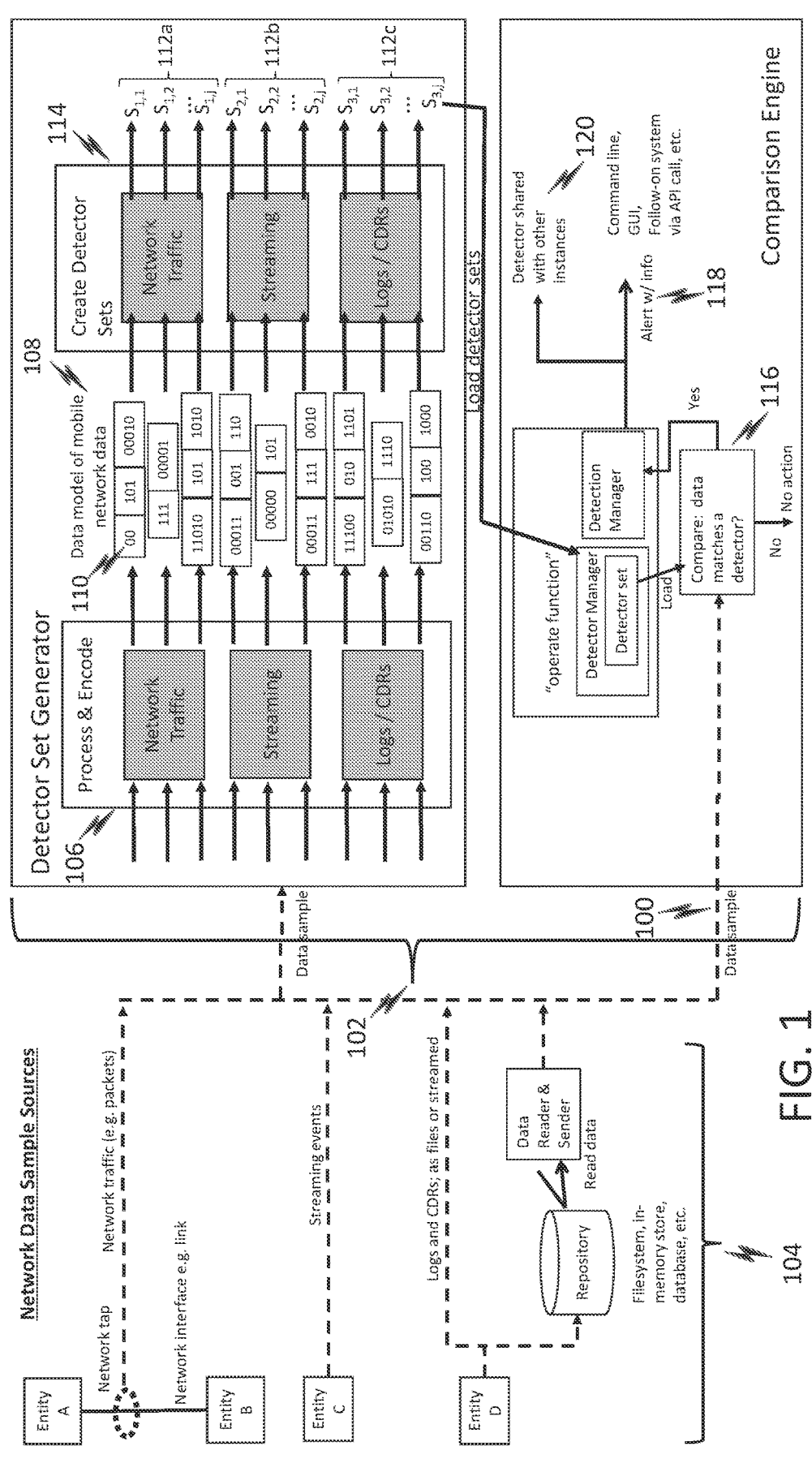
FIG. 1 illustrates anomaly detection in a mobile network in accordance with an exemplary embodiment of the present disclosure.

FIG. 1 illustrates anomaly detection in a mobile network in accordance with an exemplary embodiment of the present disclosure.

As shown in FIG. 1, anomaly detection can be implemented by a computing device 102 on network traffic between two nodes (Entities A and B), streaming data events originating from a content source node (Entity C), and/or logged data, call detail record (CDR) data, or other data files stored in and/or streamed from a repository, memory device, or source node (Entity D) on the mobile network 104. The data samples 100 obtained from the network source(s) (Entity A, B, C, or D) are passed to a logical function of the interface or a computing device configured for performing anomaly detection.

FIG. 2 illustrates a process for anomaly detection in a mobile network in accordance with an exemplary embodiment of the present disclosure. As shown in FIG. 2, the computing device 102 receives data samples formatted for communication over the mobile network (Step 200) via an interface of the mobile network 104. The computing device 102 is configured to include an encoder, which is used to build a data model of the mobile network data by extracting the data from pre-selected data fields included in each received data sample (Step 202). The data fields can be manually pre-selected and can be used as an indication of the quality of security and/or performance of a mobile network. These same data fields define the formatting for communicating the data samples over the mobile network 104. Each data field can include data values in the form of numbers, characters, or a combination thereof. The data included in each data field can be determined to be "good data" (e.g., self-data) which can be representative of mobile network data that complies with specified security and performance specifications. This good data is used to build the data model.

The one or more preselected data fields can include any of a plurality of data fields included in data that is formatted according to one or more standard data formats, such as 3$^{rd}$ Generation Partnership Project (3GPP) specifications or carrier-specific log formats. A genetic algorithm applies a process of natural selection and generates arrays containing types such as numbers, characters, or a binary string as an internal representation or data model of all the received data.

Genetic algorithms can generate high-quality solutions to optimization and search problems. These algorithms are based on Darwin's theory of natural selection and use similar approaches as a problem-solving strategy. Genetic algorithms can deal with various types of optimization, whether the objective (fitness) function is stationary or non-stationary (changes with time), linear or nonlinear, continuous or discontinuous, or with random noise. Moreover, a genetic algorithm can optimize various problems such as discrete functions, multi-objective problems, and continuous functions. A genetic algorithm does not need derivative information.

According to an exemplary embodiment, the genetic algorithm used for anomaly detection can include an Artificial Immune System (AIS) algorithm. As shown in FIG. 1, the computing device 102 processes and encodes 106 the received data samples 100 to build a data model 108. The data model 108 can include plural arrays (e.g., datasets). Each array 110 can have a value generated from numbers, characters, or a binary string based on the data field(s) included in the data sample 100. Moreover, each array 110 can represent a potential solution for the algorithm. Once the data model 108 is obtained, the computing device 102 can randomly create (e.g., generate) the detector sets 112a-112c via the detector set generator 114 and perform a negative selection operation on each detector using a negative selection algorithm as well as other genetic algorithm techniques, to discard one or more detectors associated with self-data (Step 204). Each detector set 112a-112c can be configured for the type of data sample being monitored. For example, a detector set 112a can be generated for each of network traffic which can be received from Entities A and B, a detector set 112b can be generated for streaming events which can be received from Entity C, and a detector set 112c can be generated for data files which can be received from Entity D. Because the detectors 112a-112c can be configured according to the type of data being monitored, the detectors 112a-112c follow the same format as the datasets of the data model 108 and are based on the specific and relevant fields provided in the data samples. According to an exemplary embodiment, the detector sets 112a-112c can be initialized with randomly-generated detector sets $S_{i,j}$, (where i is an integer in the range of 0<i<=number of input data types, j is an integer in the range of 0<j<=maximum number of subtypes of the input data type) using the datasets 110 of the data model 108. For example, the initialized value of the detectors $S_{i,j}$ of each detector set 112a-112c can be obtained from a range of values allocated to the data field from which the corresponding array was generated. The computing device 102 applies a negative selection algorithm to the detector sets 112a-112c whereby each detector $S_{i,j}$ is compared to self-data and only the detectors that do not match any self-data are kept. That is, the computing device 102 discards those detectors $S_{i,j}$ which match the good data of an array 110. According to an exemplary embodiment, each discarded detector should fully match the good data of an array. For example, according to an exemplary embodiment, a detector may include a wildcard such as [0, *, 1] which would then match good data [0, 0, 1] and [0, 1, 1]. As already discussed, the good data can be representative of good security and good network performance according to the 3GPP specification and/or mobile network protocol used for communication over the mobile network. Once the unwanted detectors are discarded, the remaining detectors can be used to determine whether an anomaly exists in data received over the network in the future.

The operation of the negative selection algorithm is derived from various discriminating behavior observed in the immune system of mammals. As discussed in the article "Negative selection algorithm", https://complex-systems-ai.com/en/immune-algorithm/negative-selection-algorithm/ (last accessed May 2022), the negative selection algorithm was designed for "change detection, novelty detection, intrusion detection and recognition of similar patterns and two-class classification problem areas". The algorithm balances the convergence of plural detectors and the number of detectors based on the representation of the data and the matching rule that is implemented.

During an anomaly detection operation, the computing device 102 identifies one or more pre-selected data fields of each received data sample based on the data model (Step 206). The computing device 102 extracts data from each of the preselected data fields and uses a comparison engine 116 to compare the extracted data to the detector sets $S_{i,j}$ to determine whether at least one of a security or performance anomaly exists on the mobile network 104 (Step 208). If one or more of the detector sets $S_{i,j}$ indicates a match to mobile network data, the computing device 102 can generate a data signal 118 indicating that an anomaly was detected in the mobile network data (Step 210). The data signal 118 can identify the detector and/or the data field associated with the anomaly. The data signal 118 can also include data that identifies the type of data (e.g., network traffic, streaming event, data file, etc.) which generated the anomaly and the entity from which the data was received or originated. The data signal 118 can include an explicit decode or mapping of the representation to specific mobile network data fields for purposes of giving context and information to a detector match (e.g. anomaly detection) to allow investigation of the anomaly. The data signal 118 can be communicated by a transmitter or transmitting device of the computing device 102 to a user device or server connected to the mobile network 104. According to an exemplary embodiment, the mapping can be provided manually by a user or generated and sent automatically by the computing device 102. According to another exemplary embodiment, the mapping can be generated via a command-line of a graphical user interface (GUI), or through an application programming interface (API) call to connected systems.

According to an exemplary embodiment, the user can configure the computing device for anomaly detection and/ or improving anomaly detection by providing examples of malicious data for a fitness function (discussed in detail below). According to another exemplary embodiment, the computing device can be configured with neural network for executing an artificial intelligence or machine learning algorithm trained to identify and/or classify anomalies mobile network data according to the data model 108 of the mobile network 104.

If an anomaly has been detected, the computing device 102 can perform an operation to improve anomaly detection for future communication on the mobile network. According to an exemplary embodiment of the present disclosure, the improvement in anomaly detection can be initiated by a user or initiated automatically by the processor of the computing device 102, based on training of the machine learning algorithm already discussed. The improvement in anomaly detection can follow the natural selection operation of known genetic algorithms. The natural selection process involves the selection of members from a population of individual solutions. The members can include data that fits a specified format for the population, where the format can be defined by a user. Each initial member can produce offspring (e.g., new members) which serve as the next generation. The offspring can inherent the characteristics of the initial members. The members are selected based on their relative ordering based on a fitness function. The process goes through numerous iterations until offspring best matching the fitness function are found.

In improving the solution, known genetic algorithms can further employ various operations to generate offspring and produce the fittest solution. Crossover is a process in which members of the last population are mated at random in the mating pool. Mutation is the occasional (with small probability) random alteration of the value of a field (e.g., a string position, integer, character, etc.).

Once the offspring population is created, each offspring is assigned a fitness value and evaluated thereby. By way of the evaluation, the offspring population is sorted and ranked, and probabilities for both selection and replacement phases of the search process are imposed, such that the fittest members of the population have a higher probability of passing on genetic material. The old population is replaced with the new population selected from the offspring and the fittest members of the old population. The genetic algorithm terminates after a predefined number of generations, or if some stopping criterion has been met. After a last round of negative selection on the new population which includes new offspring and the fittest members of the old (e.g., parent) population, the members of the newest population are then returned as the overall best solution. By iteratively performing the above-described operations to generate new members and populations each time an anomaly is detected, the solutions generated by the genetic algorithm can improve over time.

According to an exemplary embodiment of the present disclosure, when an anomaly is detected in the mobile network data, the computing device 102 can search for improved solutions (e.g., members of the population) by manipulating the most promising datasets of the data model 108. This operation can be influenced by the value of one or more of the hyperparameters for the genetic algorithm that are set by a user. The hyperparameters can include, for example, population size, number of generations, and chance of mutation, and any other suitable value for performing an evolutionary computation as desired. The hyperparameters can be tuned to adjust learning time, adjust detection efficacy, and/or adjust computational resources for generating detectors of the genetic algorithm.

FIGS. 3A to 3E illustrates a process flow for detector dataset generation in accordance with an exemplary embodiment of the present disclosure.

Figure 3A:
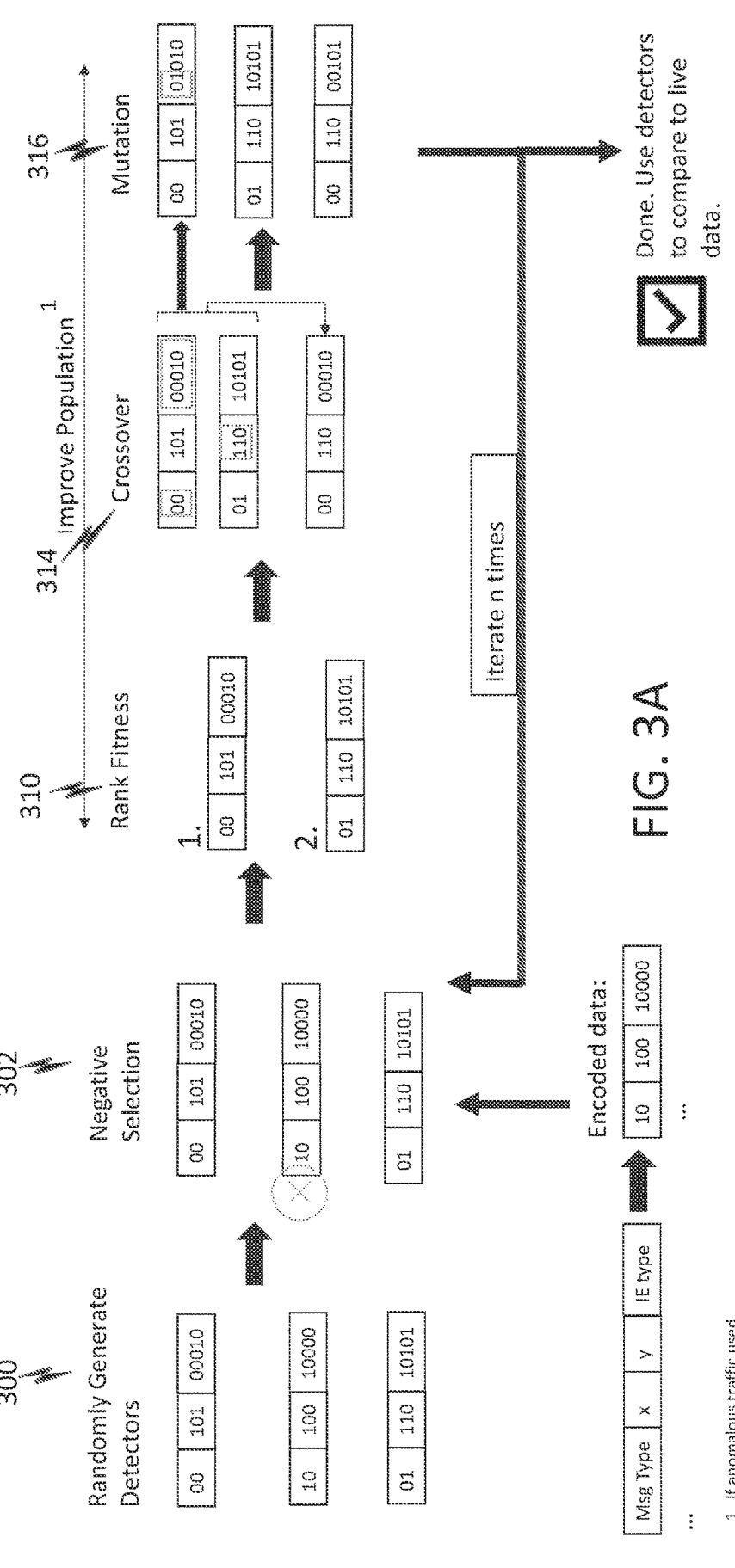

As already discussed, the computing device 102 generates the one or more detectors $S_{i,j}$, by generating data to represent one or more preselected data fields of a data sample 100. As shown in FIGS. 3A and 3B, the detector dataset is first initialized with randomly-generated values based on a range of data values allocated to data fields of the arrays in the data model (Step 300). For example, if a data sample includes the field TCP/UDP source port, the randomly generated value can be taken from the range 0 to 65,535 inclusive. The computing device 102 applies a negative selection algorithm to the detectors to remove those detectors that match self-data (e.g., good data) and keeps those detectors that do not match the self-data to detect an anomaly (Step 302). According to an exemplary embodiment, the detector must fully match an array to be discarded. Unlike the self-data, the remaining detectors $RS_{i,j}$ do not include data that meets security and performance specifications of the mobile network. Following generation of the detectors, a determination is made whether anomalous traffic is available from the mobile network (Step 304). If no anomalous traffic is available, the computing device 102 returns the detectors remaining following the negative selection operation as a solution (Step 306). If it is determined that anomalous traffic is available, the remaining detectors $RS_{i,j}$ are compared against a data sample 100 and a match results, the computing device 102 identifies the match as a detected anomaly (Step 308). The detected anomaly can demonstrate malicious or non-performant behavior as it relates to security or performance specifications of the mobile network. Once the computing device 102 detects anomalies, a user can initiate an operation, via the computing device, to improve the detector population and thereby improve anomaly detection. According to exemplary embodiments of the present disclosure, and as already discussed, the availability or presence of anomalous data on the mobile network 104 can be determined by a user or the computing device 102.

Figure 4:
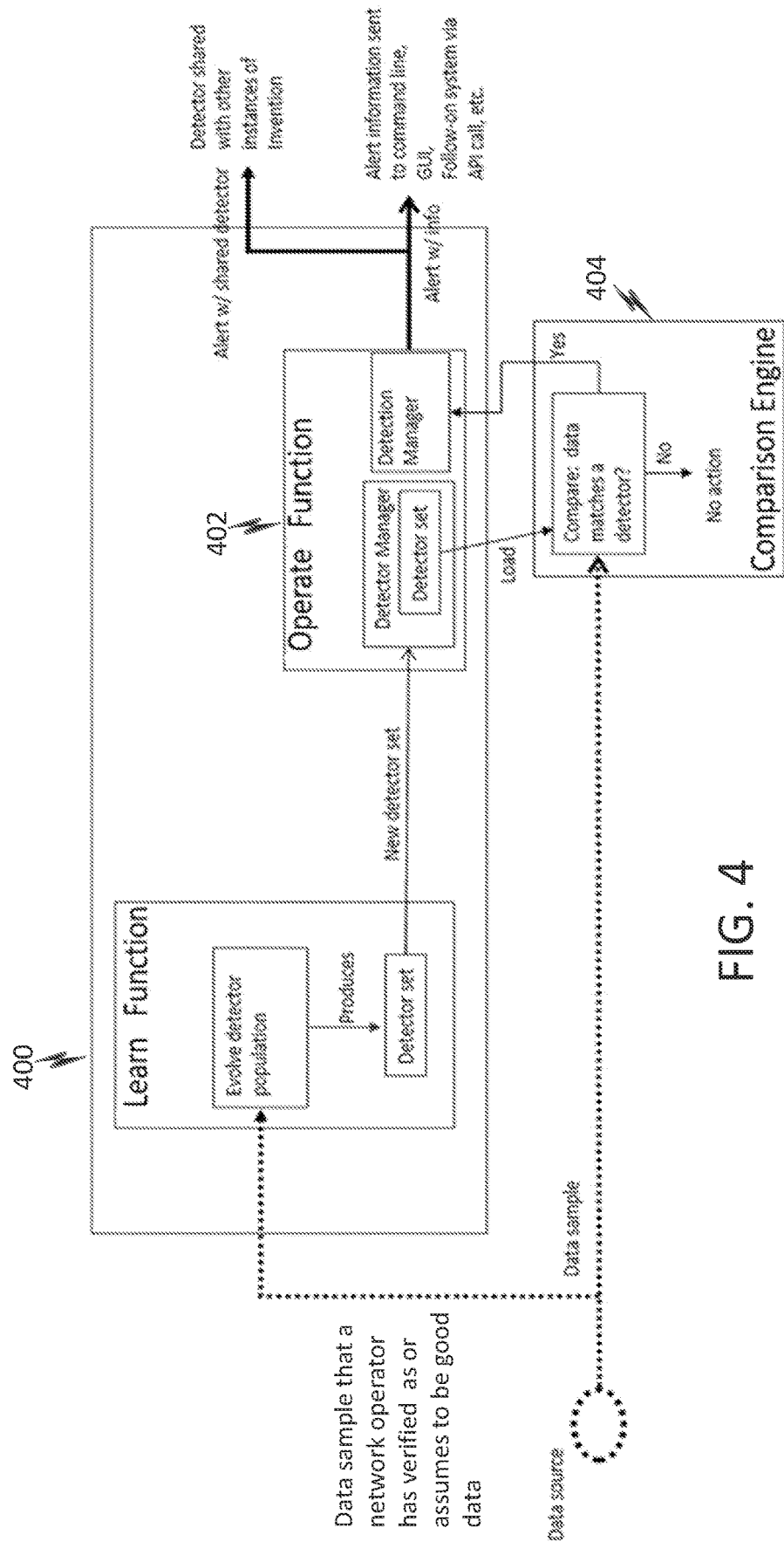
FIG. 4 illustrates a continuous learning configuration in accordance with an exemplary embodiment of the present disclosure.

FIG. 4 illustrates a continuous learning configuration in accordance with an exemplary embodiment of the present disclosure.

As shown in FIG. 4, the computing device can be configured to continuously learn by continuously creating new detectors while the last round of detectors is being used to detect anomalies. The computing device 102 can be configured to execute a continuous learning function 400, which allows the anomaly detection operation to adapt to changes in the network, the usage of the network as it relates to performance, and changing adversarial tactics and techniques as it relates to security by generating new detector sets. The computing device 102 can perform the operations of the continuous learning function 400 for a set number of iterations or until specified convergence criteria, which can be determined by the user, are achieved. Further, the computing device 102 can be configured to execute an operate function 402, which receives the new detector sets and runs a comparison engine 404 to compare new data samples extracted from the mobile network data to the detector sets 112a-112c. As already discussed with reference to FIG. 1, the results of the comparison engine can be used to determine whether an anomaly is detected in the mobile network data and whether an alert and/or the learn function should be executed.

In the first case of the invention where known anomalous data is available, FIGS. 3B and 3C show that once the continuous learning function 400 is initiated, the computing device 102 tracks a number of anomalies (e.g., malicious and/or defective traffic items) detected by each detector $RS_{i,j}$ (Step 310). The computing device 102 then applies a fitness function to assign each detector $RS_{i,j}$ a higher fitness score per a number of anomalies detected (Step 312). For example, the fitness score can be increased in proportion to the number of anomalies detected in the data samples. Next, the detectors $RS_{i,j}$ are ranked according to their level of fitness (Step 314). According to an exemplary embodiment, the ranking selection weighs each detector $RS_{i,n}$ by its rank rather than by its fitness score, so that absolute fitness scores are not considered. This helps prevent early convergence towards a single type of detector if, by chance, one of the initial detectors is more fit than others. The computing device 102 maps a probability to each detector, wherein the assigned probability for each detector increases as the rank of the detector increases (Step 316). Each detector's probability indicates the detector's probability of being selected as a parent for crossover. The probabilities are assigned so that a crossover operation can be performed using crossover techniques from genetic algorithms (Step 318). The computing device selects two detectors at random from the potential parents according to the probabilities provided in the list based on the fitness function, and combines the selected detectors to create an offspring. For example, if the computing device selects these two detectors at random: A: 00 101 00010 and B: 01 110 10101, then the computing device 102 can combine these two parents by taking the first field from A (00), the second field from B (110), and the third field from A (00010) to result in the child C: 00 110 00010. According to an exemplary embodiment, the user may use different methods of crossover for different situations as they deem appropriate. The computing device 102 continues to execute the crossover operation until the desired number of offspring detectors is reached. According to an exemplary embodiment, the desired number of offspring detectors is equal to the population size minus the number of parents that will be copied into the next generation.

Next, the computing device 102 performs a mutation operation on the offspring detectors generated from the crossover operation and higher ranked parents that will be copied into the next generation (Step 320). During this operation, the computing device 102 mutates each data field (or "gene") in each child having a probability Pm (where Pm<1) in order to complete processing of the next generation. The mutation operation changes the value of the data field mutated with a higher probability such that the resultant value is closer to the original value of the data field at a lower probability than the resultant value is farther away from the original value. For example, if the data field being mutated represents the source port and its value before mutation is 2000, then the new value after mutation will be closer to 2000 rather than anywhere in the value range 0-65535 allowed for a source port.

Figure 3D:
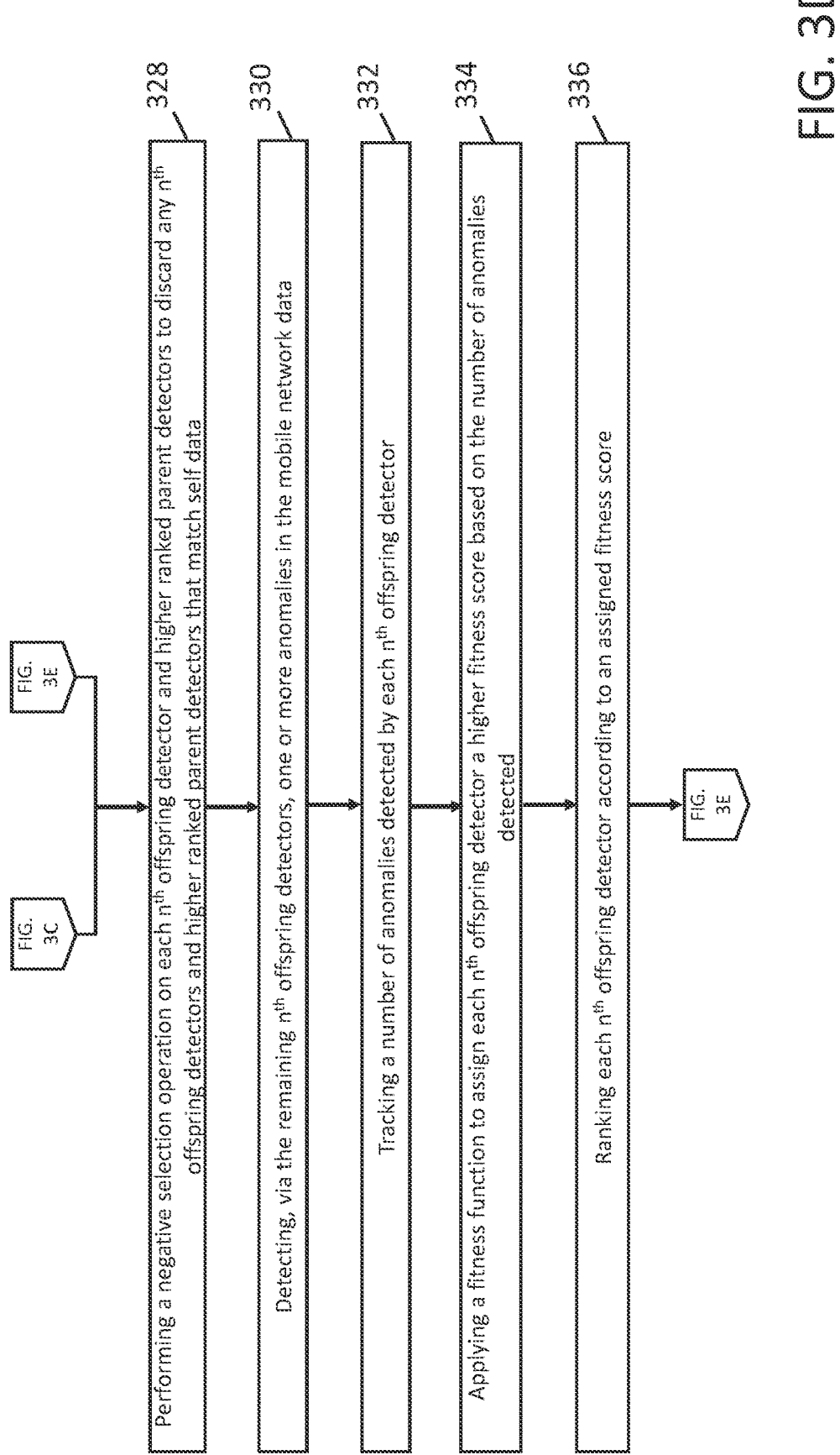

Following the mutation operation, the computing device 102 assumes a population size M of mutated datasets and selects the top (e.g., higher ranked) R (where R<M) parents from the ranking. Next, the computing device 102 combines the top R parents and the M minus R children to form the next generation (e.g., second or $n^{th}$ offspring detectors). After the mutation operation, the computing device 102 determines whether the end condition is met (Step 322). If the end condition is met, the computing device 102 performs another negative selection operation on each second offspring detector and the higher-ranked parent detectors to discard any second offspring detectors that match self data (e.g., good data) (Step 324). The computing device 102 will then stop executing the AIS algorithm and return the last generation of detectors (e.g., remaining second offspring detectors) and the higher-ranked parent detectors as a solution (Step 326). In the alternative, if the end condition is not met, the computing device 102 performs another iteration of the AIS algorithm by using the negative selection technique on the next generation of detectors (e.g., $n^{th}$ offspring detectors) obtained from the mutation operation. As shown in FIG. 3D, the computing device 102 applies the negative selection algorithm to the set of second offspring detectors (Step 328). With the remaining $n^{th}$ offspring detectors, the computing device 102 detects one or more anomalies in the data samples of the mobile network data (Step 330) and tracks the number of anomalies detected by each $n^{th}$ offspring detector (Step 332). A fitness function is applied to assign each $n^{th}$ offspring detector a higher fitness score based on the number of anomalies detected (Step 334). The computing device 102 ranks each $n^{th}$ offspring detector is ranked according to an assigned fitness score (Step 336).

Figure 3E:
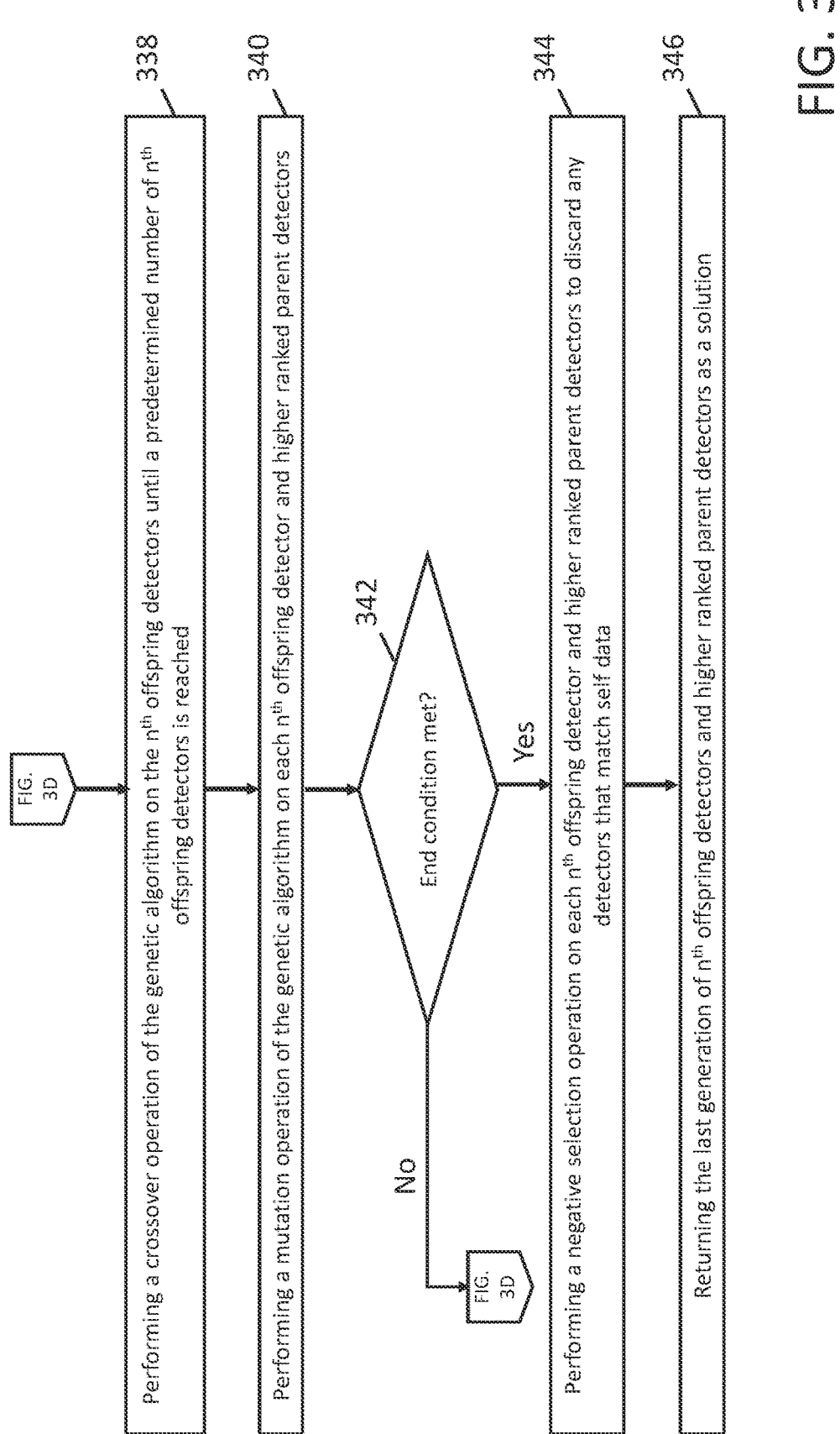

As shown in FIG. 3E, the computing device can perform a crossover operation on the second offspring detectors until a predetermined number of $n^{th}$ offspring detectors is reached (Step 338), and also can perform a mutation operation on each $n^{th}$ offspring detector and higher ranked parent detectors with a probability (i.e., of the value of one or more random elements of the member will be flipped to another value) generally less than one percent (1%) (Step 340). The computing device 102 next determines whether an end condition is met (Step 342). Possible end conditions can include iterating for a set number of generations, or stopping once average fitness over the population of detector datasets stops significantly increasing for a few generations. If the end condition is met, the computing device 102 performs a negative selection operation on each $n^{th}$ detector and higher ranked parent detectors and discards any detectors that match self-data (Step 344). The computing device 102 returns the last generation of $n^{th}$ offspring detectors and higher ranked parent detectors as a solution (Step 346). On the other and, if the end condition is again not met, the computing device 102 can perform additional iteration(s) of the Artificial Immune System algorithm by returning to Step 328 (FIG. 3D) and using the $n^{th}$ offspring detectors obtained from Step 344 as the initial detectors.

Figure 5:
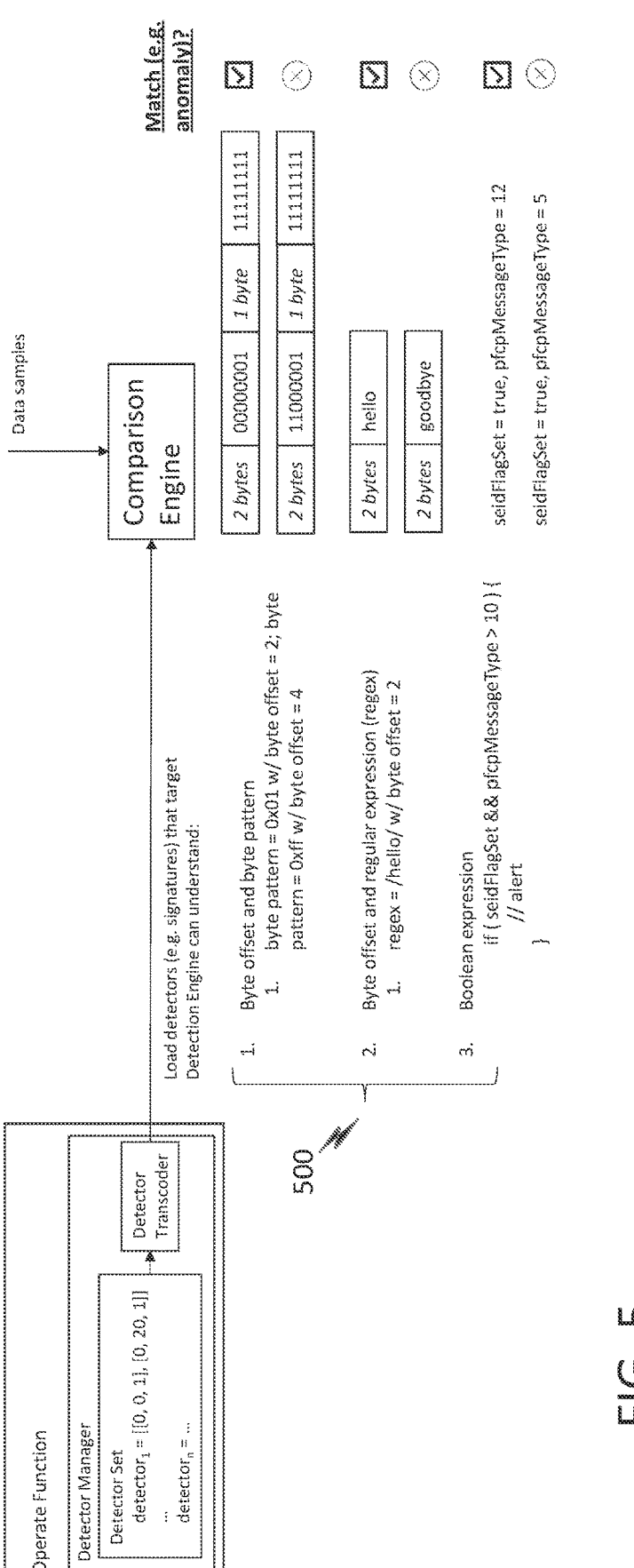
FIG. 5 illustrates a transcoding operation of the detector datasets in accordance with an exemplary embodiment of the present disclosure.

FIG. 5 illustrates a transcoding operation of the detector datasets in accordance with an exemplary embodiment of the present disclosure.

As shown in FIG. 5, once the detector dataset is created and the processing using the AIS algorithm has ended, the computing device 102 can transcode (Step 500) one or more detectors or the entire set of detectors selected as a solution from the AIS algorithm. Transcoding the detectors allows the computing device 102 to more efficiently perform detection, which involves making comparisons between a given detector dataset and a data sample of the mobile network data using such formats as byte pattern with byte offset, Boolean, regex, or other suitable format as desired.

According to an exemplary embodiment, the detectors can be shared with other detection systems as a representation of specific and relevant mobile network data fields. For example, as shown in FIG. 1, the computing device can generate a data signal 120 for moving the detectors amongst different instances of the same interface on some periodic or random basis to improve detection efficacy. In addition, sharing detectors can reduce computation overhead involved with generating large detector sets or performing comparisons with large detector sets. Moreover, sending detectors that match (e.g. hit on an anomaly) to other systems that process the same mobile network data helps increase detection efficacy.

According to an exemplary embodiment, detection can be performed as a logical function at one or more nodes of the mobile network or loaded manually or automatically into a separate computing device, such as an intrusion detection system (IDS), which monitors a network or systems for malicious activity or policy violations. Moreover, the detection operation can be performed on data samples in live traffic or data samples from captured traffic in a format such as packet capture (PCAP). The detector, however transcoded or expressed, and wherever located for any reason such as for detection, in a logical function of this invention or a separate device (e.g. IDS), conveys the representation of specific and relevant mobile network data fields, either explicit or implicit.

FIG. 6 illustrates anomaly detection in a 5G mobile network architecture in accordance with an exemplary embodiment of the present disclosure. As shown in FIG. 6, anomaly detection can be implemented on network traffic flowing on the user plane and the control plane. Known control plane components and functions in a mobile network can include, among others, a Network Slice-Specific Authentication and Authorization Function (NSSAAF), a Network Slice Selection Function (NSSF), an Authentication Server Function (AUSF), an Access and Mobility Management Function (AMF), and a Session Management Function (SMF), a Network Exposure Function (NEF), a Network Repository Function (NRF), a Policy Control Function (PCF), a Unified Data Repository (UDR), a Unified Data Management (UDM), and a Security Edge Protection Proxy (SEPP). Known user plane components in a mobile communication network can include, among others, the User Plane Function (UPF) which connects to a Data Network (DN). User Equipment (UE), an endpoint of the mobile network, and the (Radio) Access Network ((R)AN) interact with both the control plane and user plane. According to exemplary embodiments, anomaly detection can be conducted at an N1 interface between the AMF of the control plane and endpoint and at the N2 interface between the AMF of the control plane and the (R)AN. Anomaly detection can also be implemented at the N4 interface between the SMF of the control plane and the UPF of the user plane. According to another exemplary embodiment, anomaly detection can be conducted at the interface between the endpoint and the (R)AN, at the N3 interface between the RAN and the UPF of the user plane, at the N9 interface between two UPFs of the user plane, at the N6 interface between the UPF of the user plane and the DN of the user plane, and across the Service-Based Architecture (SBA), and on the N32 interface between the SEPP of the control plane and a peer 5G mobile network. According to exemplary embodiments described herein, it should be understood that anomaly detection can be performed at any point throughout entire mobile network including any endpoint and any interface. The endpoints and interfaces can include those components configured for operation on a 5G mobile network including the endpoint and interfaces already discussed.

FIG. 7A illustrates anomaly detection in a mobile network architecture in accordance with an exemplary embodiment of the present disclosure. As shown in FIG. 7A, the endpoint 700 includes a baseband processor 702, an application processor 704, and an anomaly detection unit 706. It should be understood that the operations of the anomaly detection unit 706 can be performed by the application processor 704 or by another processor as desired. The baseband processor 702 is configured to process data that is to be communicated over the network 712 and/or that is received from the network 712 and the application processor 704 for processing. For example, the baseband processor 702 can covert data to a signal that can be used to modulate the carrier frequency for transmission over a communication channel or demodulate the carrier frequency for reception over a communication channel. The application processor 704 is configured for managing and controlling operations performed by the operating system of the endpoint. The anomaly detection unit 704 is configured to monitor data traffic generated and received by the baseband processor 702 and the application processor 704. The data traffic is analyzed based on messages 708 received from the baseband processor 702. The anomaly detection unit 704 generates an alert 710 when the analysis indicates that the data contains an anomaly.

Figure 7B:
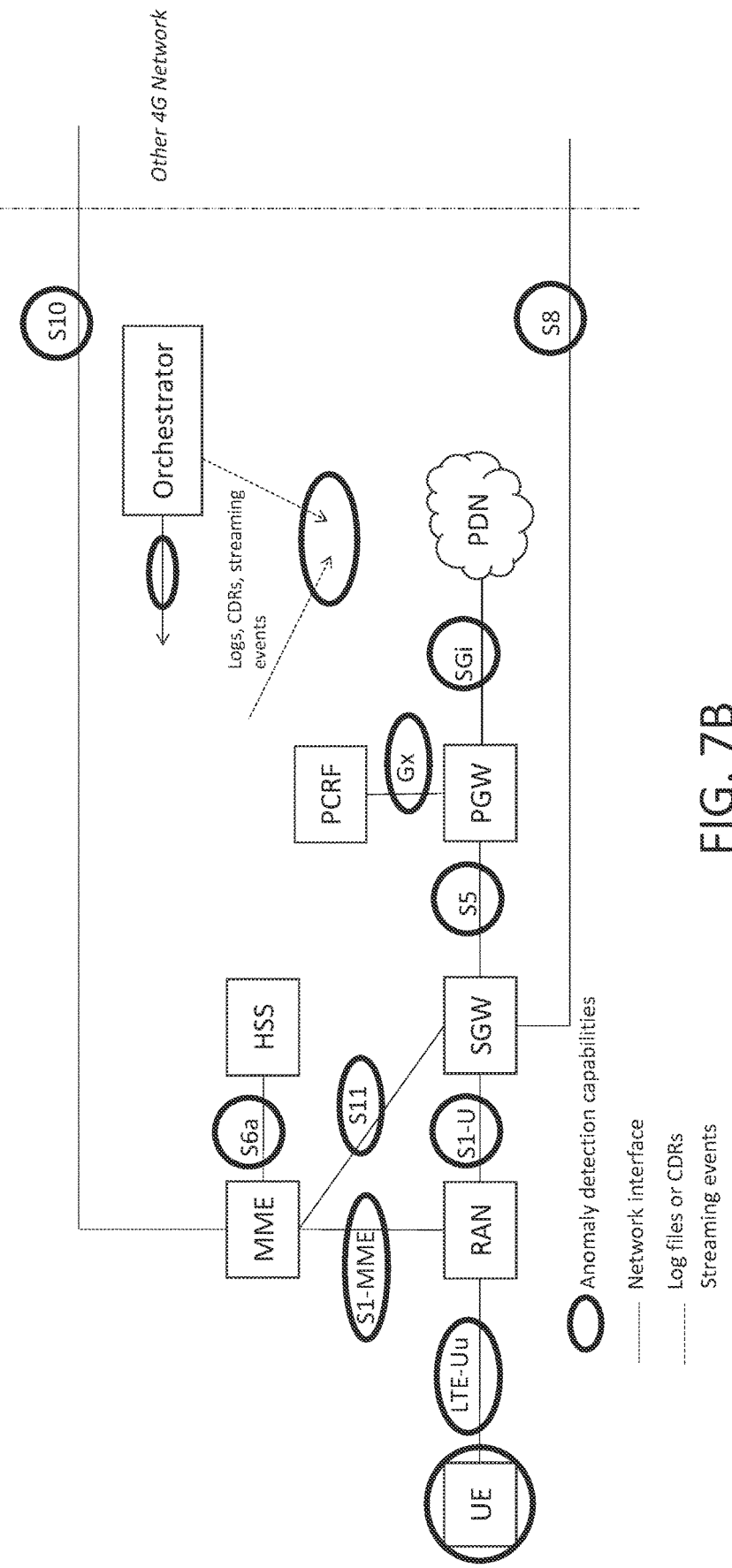
FIG. 7B illustrates anomaly detection in a 4G mobile network architecture in accordance with an exemplary embodiment of the present disclosure.

FIG. 7B illustrates anomaly detection in a 4G mobile network architecture in accordance with an exemplary embodiment of the present disclosure. As shown in FIG. 7B, anomaly detection can be implemented on user network traffic and control network traffic flowing on the user plane and the control plane. The endpoint 700 (UE), an endpoint of the mobile network, and the Radio Access Network (RAN) interact with both the control plane and user plane. Known control plane components and functions in a 4G mobile communication network can include, among others, a Mobility Management Entity (MME), a Home Subscriber Server (HSS), and a Policy and Charging Rules Function (PCRF). Known user plane components in a mobile communication network can include, among others, a Serving Gateway (SGW) and Packet Data Network Gateway (PGW), which connects to a Packet Data Network (PDN). According to exemplary embodiments, anomaly detection can be conducted at an S1-MME interface between the MME of the control plane and the RAN. Anomaly detection can also be implemented at the S6a interface between the MME of the control plane and the HSS of the control plane and the S10 between the MME of the control plane and a peer 4G mobile network. Anomaly detection can also be implemented at the S11 interface between the MME of the control plane and the SGW of the user plane and at the Gx interface between the PCRF of the control plane and the PGW of the user plane. According to another exemplary embodiment, anomaly detection can be conducted at the LTE-Uu interface between the endpoint and the RAN, at the S1-U interface between the RAN and the SGW of the user plane, at the S8 interface between the SGW of the user plane and a peer 4G mobile network, at the S5 interface between the SGW of the user plane and the PGW of the user plane, and at the SGi interface between the PGW of the user plane and the PDN of the user plane.

Figure 8:
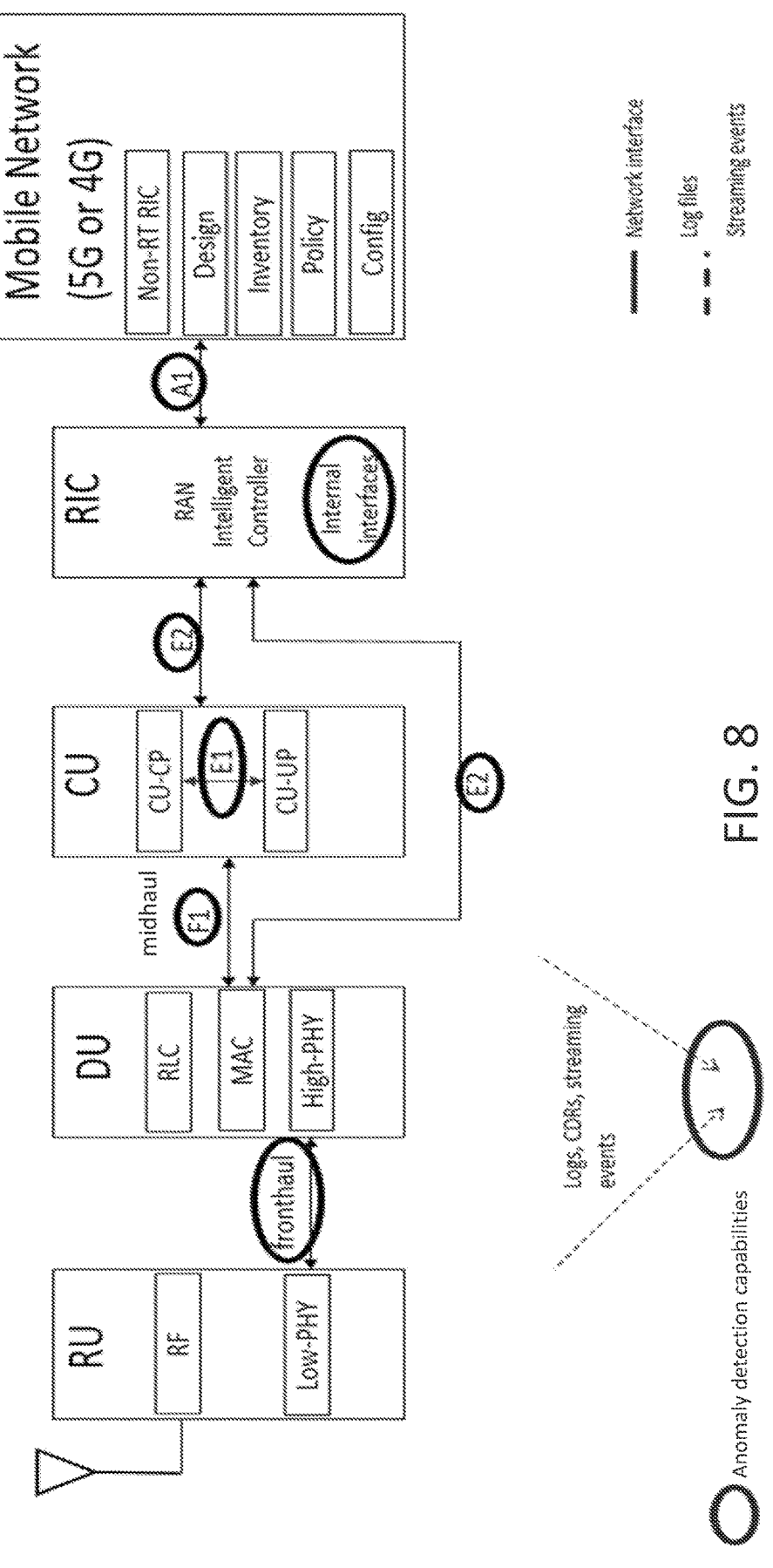
FIG. 8 illustrates anomaly detection in an Open Radio Access Network (O-RAN) Alliance enabled mobile network architecture in accordance with an exemplary embodiment of the present disclosure.

FIG. 8 illustrates anomaly detection in an Open Radio Access Network (O-RAN) Alliance enabled mobile network architecture in accordance with an exemplary embodiment of the present disclosure; without loss of generality, anomaly detection applies similarly to Open RAN, virtualized RAN (vRAN), and similar RAN environments. The mobile network nodes can include radio units (RU), centralized units (CU), distributed units (DU), RAN intelligent controllers (RIC), or other types of devices as desired. The network devices can include base station controllers, radio network controllers, IP network devices, mobile user devices, cloud computing, etc. The interfaces can be implemented as executable software code stored in memory devices of the nodes and network devices. It is at these interfaces, where anomaly detection in accordance with the exemplary embodiments of the present disclosure can be applied. The nodes and network device can store, in an associated memory device, programming code for generating a detector dataset for anomaly detection in the mobile network. The programming code for generating a detector can be executed by a processor of the node and network device. As a result, the processor can perform operations that configure the nodes and/or network device to perform the anomaly detections operations. These operations include receiving, by a receiver of a computing device, data samples formatted for communication on the mobile network. For example, the received data samples can be obtained by tapping the interface between the two nodes or between the node and network device depending on the location on the mobile network. According to another exemplary embodiment, anomaly detection can be performed at a network interface between an orchestrator which can output data logs, data files, streaming events, call data records, or other file formats as desired, and other nodes on the mobile network.

Figure 9:
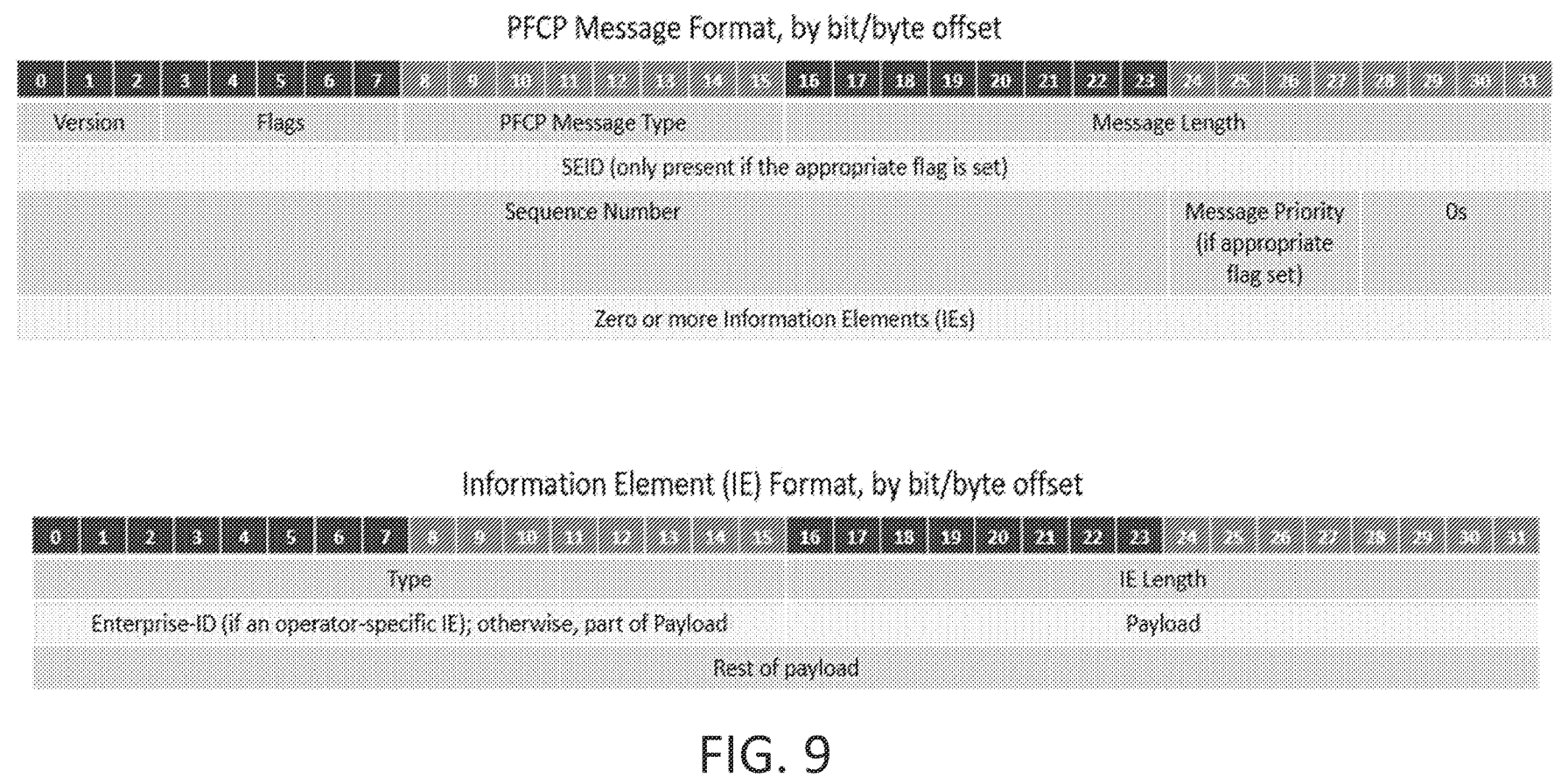

FIG. 9 illustrates a data sample format in accordance with an exemplary embodiment of the present disclosure. As shown in FIG. 9, the plurality of data fields of the mobile network data can include fields such as: source and destination Internet Protocol, source and destination port, Packet Forwarding Control Protocol (PFCP) message type, a flag indicating whether the Session Endpoint IDentifier (SEID) is set, one or more information element types, and other data fields used in the standard format of the information type as desired. The model dataset also represents conditions under which the mobile communication network meets at least one of a security specification and a performance specification. Once the data samples are received, the processor generates one or more detector datasets from the model dataset of the mobile network data as shown in FIG. 1 (element 106).

Figure 10:
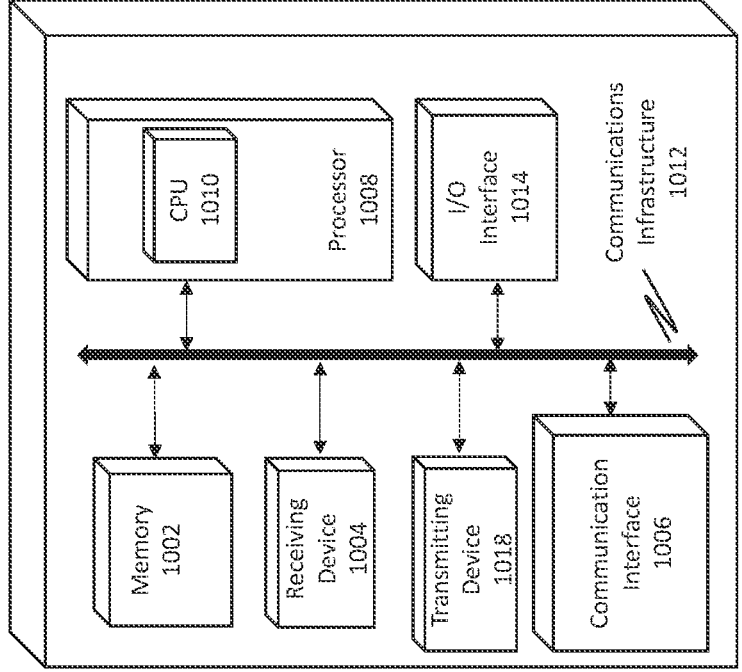
FIG. 10 illustrates a computing device for anomaly detection in accordance with an exemplary embodiment of the present disclosure.

FIG. 10 illustrates a computing device for anomaly detection in accordance with an exemplary embodiment of the present disclosure.

As shown in FIG. 10, the computing system or device 1000 can include memory 1002, a receiving device 1004, a communication interface 1006, a processor 1008, a communication infrastructure 1014, an input/output (I/O) interface 1016, and a transmitting device 1018.

The memory 1002 can be configured for storing program code for at least one machine learning model. The memory 1002 can include one or more memory devices such as volatile or non-volatile memory. For example, the volatile memory can include random access memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device connected to communicate with the system 1000 via a mobile communication network. According to an exemplary embodiment, an external memory device can be used in place of any resident memory devices. Data stored in system 1000 may be stored on any type of suitable computer readable media, such as optical storage (e.g., a compact disc, digital versatile disc, Blu-ray disc, etc.) or magnetic tape storage (e.g., a hard disk drive). The stored data can include network traffic data, log data, streaming events, and/or CDRs generated and/or accessed by the processor 1008, and software or program code used by the processor 1008 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The receiving device 1004 may be a combination of hardware and software components configured to receive data samples from the mobile network or database. According to exemplary embodiments, the receiving device 1004 can include a hardware component such as an antenna, a network interface (e.g., an Ethernet card), a communications port, a Personal Computer Memory Card International Association (PCMCIA) slot and card, 5G New Radio (NR) interface, or any other component or device suitable for use on a mobile communication network or Radio Access Network as desired. The receiving device 1004 can be an input device for receiving signals and/or data samples formatted according to 3GPP protocols and/or standards. The receiving device 1004 can be connected to other devices via a wired or wireless network or via a wired or wireless direct link or peer-to-peer connection without an intermediate device or access point. The hardware and software components of the receiving device 1004 can be configured to receive the data from the mobile network according to one or more communication protocols and data formats. For example, the receiving device 1004 can be configured to communicate over a network, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, the receiving device 1004 can be configured to identify parts of the received data via a header and parse the data signal and/or data packet into small frames (e.g., bytes, words) or segments for further processing at the processor 1008.

The processor 1008 can be configured for executing the program code stored in memory 1002. Upon execution, the program code causes the processor 1008 to perform the functions at a node on the mobile communication network or remote computing device (e.g., server, computer, etc.) of the user and execute a genetic algorithm such as an Artificial Immune System algorithm that builds plural detectors datasets for anomaly detection on the mobile communication network according to the exemplary embodiments described herein. The processor 1008 can be a special purpose or a general purpose computing device encoded with program code or software for performing the exemplary functions and/or features disclosed herein. According to exemplary embodiments of the present disclosure, the processor 1008 can include a central processing unit (CPU) 1010. The CPU 1010 can be connected to the communications infrastructure 1012 including a bus, message queue, or network, multi-core message-passing scheme, for communicating with other components of the system 1000, such as the memory 1002, input device 1004, the communications interface 1006, and the I/O interface 1014. The CPU 1010 can include one or more processors such as a microprocessor, micro-computer, programmable logic unit or any other suitable hardware computing devices as desired.

The I/O interface 1014 can be configured to receive the signal from the processor 1008 and generate an output suitable for a peripheral device via a direct wired or wireless link. The I/O interface 1014 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The transmitting device 1016 can be configured to receive data from the processor 1008 and assemble the data into a data signal and/or data packets according to the specified communication protocol and data format of a peripheral device or remote device to which the data is to be sent. The transmitting device 1016 can include any one or more of hardware and software components for generating and communicating the data signal over the communications infrastructure 1012 and/or via a direct wired or wireless link to a peripheral or remote device. The transmitting device 1018 can be configured to transmit information according to one or more communication protocols and data formats as discussed in connection with the receiving device 1004.

According to exemplary embodiments described herein, the memory 1002 and the device processor 1008 can store and/or execute computer program code for performing the specialized functions described herein. It should be understood that the program code can be stored on a non-transitory computer usable medium, such as the memory devices for the system 1000 (e.g., computing device), which may be memory semiconductors (e.g., DRAMs, etc.) or other tangible non-transitory means for providing software to the system 1000. The computer programs (e.g., computer control logic) or software may be stored in memory devices (e.g., device memory 1002) resident on/in the system 1000. The computer programs may also be received from external storage devices and/or network storage locations via a communications interface. Such computer programs, when executed, may enable the system 1000 to implement the present methods and exemplary embodiments discussed herein. Accordingly, such computer programs may represent controllers of the system 1000. Where the present disclosure is implemented using software, the software may be stored in a computer program product or non-transitory computer readable medium and loaded into the system 1000 using any one or combination of a removable storage drive, an interface for internal or external communication, and a hard disk drive, where applicable.

In the context of exemplary embodiments of the present disclosure, a processor can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the system 1000 to perform the functions disclosed herein. It will be apparent to persons having skill in the relevant art that such processes result in the system 1000 being a specially configured computing device uniquely programmed to perform the functions of the exemplary embodiments described herein.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for anomaly detection in a mobile network, the method comprising:

storing, in memory of a computing device, programming code for generating a set of detectors for anomaly detection in the mobile network;

executing, by a processor of the computing device, the programming code for generating the set of detectors, the programming code causing the processor to configure the computing device for:

(a) receiving, by a receiver of a computing device, data samples formatted for communication over the mobile network;

(b) building, by the processor of the computing device, a data model of the mobile network data using one or more data fields included in each received data sample, the data model including plural first datasets representing a mobile network data that meets at least one of a security or performance specification and plural second datasets representing mobile network data that does not meet at least one of a security or performance specification;

(c) generating, by the processor of the computing device, the set of detectors from the data model of the mobile network data randomly and performing a negative selection operation on each detector to discard one or more detectors associated with the plural first datasets;

(d) extracting, by the processor of the computing device, data from the one or more data fields included in the received data samples, the one or more data fields being used to build the data model; and (e) comparing, by the processor of the computing device, the extracted data to the one or more detectors to determine whether at least one of a security or performance anomaly exists on the mobile network, wherein when an anomaly is detected in a data sample, the processor of the computing device is further configured for:

(i) tracking a number of anomalies detected by the at least one detector (M), where M is a population size;

(ii) applying a fitness function to assign the at least one detector (M) a higher fitness score based on the number of anomalies detected; and (ii) ranking the at least one detector (M) according to an assigned fitness score.

2. The method of claim 1, further comprising:

(f) repeating, by the processor of the computing device, steps (a) to (c) for any newly received data samples to update the data model of the mobile network data until a specified end condition is met.

3. The method of claim 1, wherein the mobile network uses one of a fifth generation (5G), fourth generation (4G), or Open Radio Access Network (O-RAN) Alliance mobile network standard and associated protocols.

4. The method of claim 1, wherein the data samples are received from at least one of an endpoint, a mobile network interface, a storage location on the mobile network, a content provider on the mobile network.

5. The method of claim 1, wherein to generate the set of detectors, the processor of the computing device is further configured for:

(g) randomly generating each detector based on a range of data values allocated to an associated one of the one or more data fields used to build the data model; and (h) performing the negative selection operation on each detector of the data model.

6. The method of claim 5, wherein when an anomaly is detected in a data sample, the processor of the computing device is further configured for:

(i) assigning the at least one ranked detector a specified probability included in a list of plural probabilities, wherein the assigned probability for each detector dataset increases as the rank of the detector increases; and (i) performing a crossover operation of the genetic algorithm on the at least one ranked detector (M) until M—R offspring are reached, where R is one or more higher-ranked parents.

7. The method of claim 6, further comprising:

performing a mutation operation of the genetic algorithm to each data field of each offspring detector and each of the top R parents that will be included in the next generation with a probability less than or equal to one percent.

8. The method of claim 6, further comprising:

performing a mutation operation of the genetic algorithm to each data field of each offspring detector and each of the top R parents that will be included in the next generation with a probability less than one-hundred percent.

9. The method of claim 6, wherein the anomaly detection is performed by the processor of the computing device executing artificial intelligence or machine learning algorithms.

10. The method of claim 6, wherein a user provides one or more examples of malicious data to the fitness function.

11. The method of claim 6, wherein when the specified end condition is met, the method further comprising:

performing a negative selection on the last generation of offspring detectors and higher-ranked parent detectors; and returning a last generation of offspring detectors and higher-ranked parent detectors as the selected detectors.

12. The method of claim 6, wherein when the specified end condition is not met, the processor of the computing device is further configured for:

performing the negative selection operation on each offspring detector;

tracking a number of anomalies detected by each offspring detector;

applying a fitness function to assign each offspring detector a higher fitness score based on the number of anomalies detected;

ranking each offspring detector according to an assigned fitness score;

assigning a probability to each offspring detector, wherein the assigned probability for each offspring detector increases as the rank of the offspring detector increases; and performing a crossover operation of the genetic algorithm on the offspring detectors until a predetermined number of second offspring detectors is reached.

13. The method of claim 12, further comprising:

performing a mutation operation of the genetic algorithm to each data field of each second offspring detector and higher ranked parent detectors with a probability less than one percent.

14. The method of claim 12, further comprising:

performing a mutation operation of the genetic algorithm to each data field of each second offspring detector and higher ranked parent detectors with a probability less than one-hundred percent.

15. The method of claim 12, wherein the processor of the computing device is further configured for:

tuning one or more parameters of the data model to: adjust at least a length of time to train the genetic algorithm, adjust detection efficacy, and/or adjust computational resources for generating detectors.

16. The method of claim 1, wherein to compare the extracted data fields to the one or more detectors, the processor is further configured for:

transcoding the one or more detectors using a specified data format.

17. The method of claim 6, further comprising:

mapping the data model to the one or more data fields of the received data samples.

18. The method of claim 1, further comprising:

transmitting, by a transmitter of the computing device, the one or more detectors to a remote computing device.

19. The method of claim 1, wherein the plurality of data fields of the mobile network data comprises: source and destination Internet Protocol, source and destination port, Packet Forwarding Control Protocol (PFCP) message type, a flag indicating whether the Session Endpoint IDentifier (SEID) is set, and/or one or more information element types.

20. A system for anomaly detection in a mobile network, the system comprising:

memory configured to store programming code for generating a set of detectors for anomaly detection in the mobile network;

a receiver configured to receive data samples formatted for communication over the mobile network;

a processor configured to execute the programming code for generating the set of detectors, the programming code causing the processor to:

(a) build a data model of the mobile network data using one or more data fields included in each received data sample, the data model including plural first datasets representing a mobile network data that meets at least one of a security or performance specification and plural second datasets representing mobile network data that does not meet at least one of a security or performance specification;

(b) generate the set of detectors from the data model of the mobile network data randomly and perform a negative selection operation on each detector to discard one or more detectors associated with the plural first datasets;

(c) extract data from the one or more data fields included in the received data samples, the one or more data fields being used to build the data model; and (d) compare the extracted data to the set of detectors to determine whether at least one of a security or performance anomaly exists on the mobile network, wherein when an anomaly is detected in a data sample, the processor of the computing device is further configured to:

(i) track a number of anomalies detected by the at least one detector;

(ii) apply a fitness function to assign the at least one detector a higher fitness score based on the number of anomalies detected; and (iii) rank the at least one detector according to an assigned fitness score.

21. The system of claim 20, wherein the processor is further configured to:

repeat steps (a) to (b) for any newly received data samples to update the data model of the mobile network data until a specified end condition is met.

22. The system of claim 20, wherein to generate the set of detectors, the processor is further configured to:

(e) randomly generate each detector based on a range of data values allocated to an associated one of the one or more data fields used to build the data model; and (f) apply the negative selection algorithm to each detector in the set of detectors.

23. The system of claim 22, wherein when an anomaly is detected in a data sample, the processor is further configured to:

(g) assign the at least one ranked detector a probability, wherein the assigned probability for each detector dataset increases as the detector's rank increases; and (h) perform a crossover operation of the genetic algorithm on the at least one ranked detector until a predetermined number of offspring is reached.

24. The system of claim 23, wherein the processor is further configured to:

perform a mutation operation of the genetic algorithm to each data field of each offspring detector and higher ranked parent detectors with a probability less than or equal to one percent.

25. The system of claim 23, wherein the processor is further configured to:

perform a mutation operation of the genetic algorithm to each data field of each offspring detector and higher ranked parent detectors with a probability less than one-hundred percent.

26. The system of claim 23, wherein when the specified end condition is met, the processor is further configured to:

perform a negative selection operation on each offspring detector and the higher ranked parent detectors; and return a last generation of offspring detectors and the higher ranked parent detectors as the selected detectors.

27. The system of claim 23, wherein when the specified end condition is not met, the processor is further configured to:

perform the negative selection operation on each offspring detector to select one or more offspring detectors do not meet at least one of a security or performance specification;

track a number of anomalies detected by each offspring detector;

apply a fitness function to assign each offspring detector a higher fitness score based on the number of anomalies detected;

rank each offspring detector according to an assigned fitness score;

assign each offspring detector a probability from a list of plural probabilities allocated to the set of detectors, wherein the assigned probability for each offspring detector increases as the rank of the offspring detector increases; and perform a crossover operation of the genetic algorithm on the offspring detectors until a predetermined number of second offspring detectors is reached.

28. The system of claim 27, wherein the processor is further configured to:

perform a mutation operation of the genetic algorithm on each second offspring detector with a probability less than or equal to one percent.

29. The system of claim 27, wherein the processor is further configured to:

perform a mutation operation of the genetic algorithm on each second offspring detector with a probability less than or equal to one-hundred percent.

30. The system of claim 20, wherein the data samples are received from one of an endpoint, a mobile network interface, a storage location on the mobile network, and a content provider on the mobile network.

31. The system of claim 20, wherein the processor of the computing device is further configured to:

tune one or more parameters of the data model to adjust at least a length of time to build the detectors.

32. The system of claim 20, wherein to compare the extracted data to the set of detectors, the processor is further configured to:

transcode the set of detectors using a specified data format.

33. The system of claim 20, further comprising:

a transmitter configured to transmit the set of detectors to a remote computing device on the mobile network for performing anomaly detection in a different location on the mobile network.

34. The system of claim 20, wherein the plurality of data fields of the mobile network data comprises: source and destination Internet Protocol, source and destination port, Packet Forwarding Control Protocol (PFCP) message type, a flag indicating whether the Session Endpoint IDentifier (SEID) is set, and/or one or more information element types.

35. A non-transitory computer-readable medium that stores programming code for performing anomaly detection in a mobile communication network, the computer-readable medium when placed in communicable contact with a computing device, causes the computing device to perform operations comprising:

storing, in memory of a computing device, programming code for generating a set of detectors for anomaly detection in the mobile communication network;

executing, by a processor of the computing device, the programming code for generating the set of detectors, the programming code causing the processor to configure the computing device for:

(a) receiving, by a receiver of a computing device, data samples formatted for communication on the mobile network;

(b) building, by the processor of the computing device, a data model of the mobile network data using one or more data fields included in each received data sample, the data model including plural first datasets representing a mobile network data that meets at least one of a security or performance specification and plural second datasets representing mobile network data that does not meet at least one of a security or performance specification;

(c) generating, by the processor of the computing device, the set of detectors from the data model of the mobile network data randomly and performing a negative selection operation on each detector to discard one or more detectors associated with the plural first datasets;

(d) extracting, by the processor of the computing device, data from one or more data fields included in the received data samples, the one or more data fields being used to build the data model; and (e) comparing, by the processor of the computing device, the extracted data to the set of detectors to determine whether at least one of a security or performance anomaly exists on the mobile network, wherein when an anomaly is detected in a data sample, the processor of the computing device is further configured for:

(i) tracking a number of anomalies detected by the at least one detector (M), where M is a population size;

(ii) applying a fitness function to assign the at least one detector (M) a higher fitness score based on the number of anomalies detected; and (iii) ranking the at least one detector (M) according to an assigned fitness score.

* * * * *